United States Patent [19]
Takeda et al.

[11] Patent Number: 6,101,215
[45] Date of Patent: Aug. 8, 2000

[54] DATA TRANSMISSION APPARATUS, DATA RECEPTION APPARATUS, AND MEDIUM

[75] Inventors: Hidetoshi Takeda, Neyagawa; Masazumi Yamada, Moriguchi, both of Japan

[73] Assignee: Matsushita Electric Industrial Co., Ltd., Osaka, Japan

[21] Appl. No.: 09/022,634

[22] Filed: Feb. 12, 1998

[30] Foreign Application Priority Data

Feb. 12, 1997 [JP] Japan ................................. 9-027433

[51] Int. Cl.⁷ ..................................................... H04B 1/38
[52] U.S. Cl. ............................................ 375/221; 710/100
[58] Field of Search .................................. 375/221, 242, 375/376; 370/395, 516; 386/52, 54, 68, 124, 125; 348/7, 8, 461; 710/100, 260

[56] References Cited

U.S. PATENT DOCUMENTS

| | | | |
|---|---|---|---|
| 5,576,902 | 11/1996 | Lane et al. | 386/68 |
| 5,781,599 | 7/1998 | Shiga | 375/376 |
| 5,933,430 | 8/1999 | Osakabe et al. | 370/395 |

FOREIGN PATENT DOCUMENTS

| | | | |
|---|---|---|---|
| 0843482 | 5/1998 | European Pat. Off. | H04N 7/24 |
| 402214957 | 8/1990 | Japan | G06F 13/00 |

OTHER PUBLICATIONS

"Consumer Applications of the IEEE 1394 Serial Bus, and a 1394/CV Video Editing System," Alan T. Wetzel, et al., presented at the International Conference on Consumer Electronics in Chicago, Illinois, Jun. 1996.

"1394 High Performance Serial Bus: The Digital Interface for ATV," Adam K. Kunzman, et al., Texas Instruments, *IEEE Transactions on Consumer Electronics*, Aug. 1995, vol. 14, No. 13, pp. 893–900.

*Primary Examiner*—Stephen Chin
*Assistant Examiner*—Chieh M. Fan
*Attorney, Agent, or Firm*—Smith, Gambrell & Russell, LLP

[57] ABSTRACT

A data transmission apparatus comprises a data transmitting part for transmitting data processed by a specified processing method to a data reception apparatus, a storing part for storing a processing method for the data reception apparatus for processing said processed data in the data reception apparatus, an identification information adding part for adding identification information showing whether transfer of processing method for said data reception apparatus is possible or not, to said transmission data, and a request response part for issuing the processing method for said data reception apparatus, on the basis of the request relating to the processing method for said data reception apparatus which being transmitted from said data reception apparatus receiving said transmission data.

15 Claims, 19 Drawing Sheets

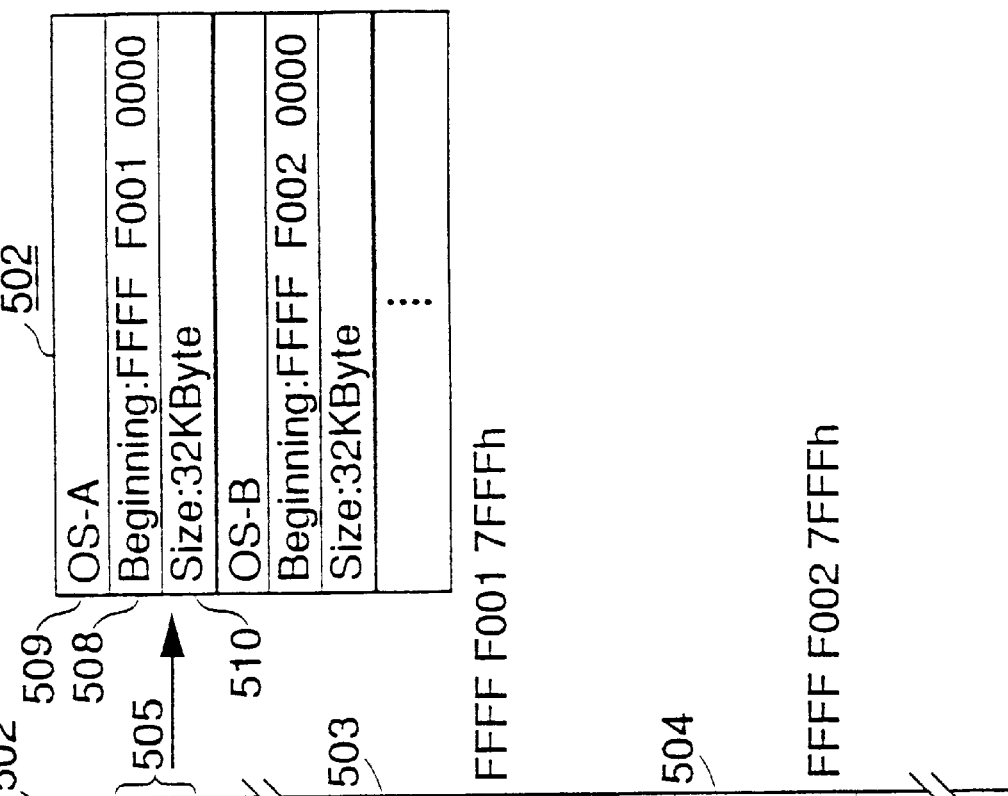
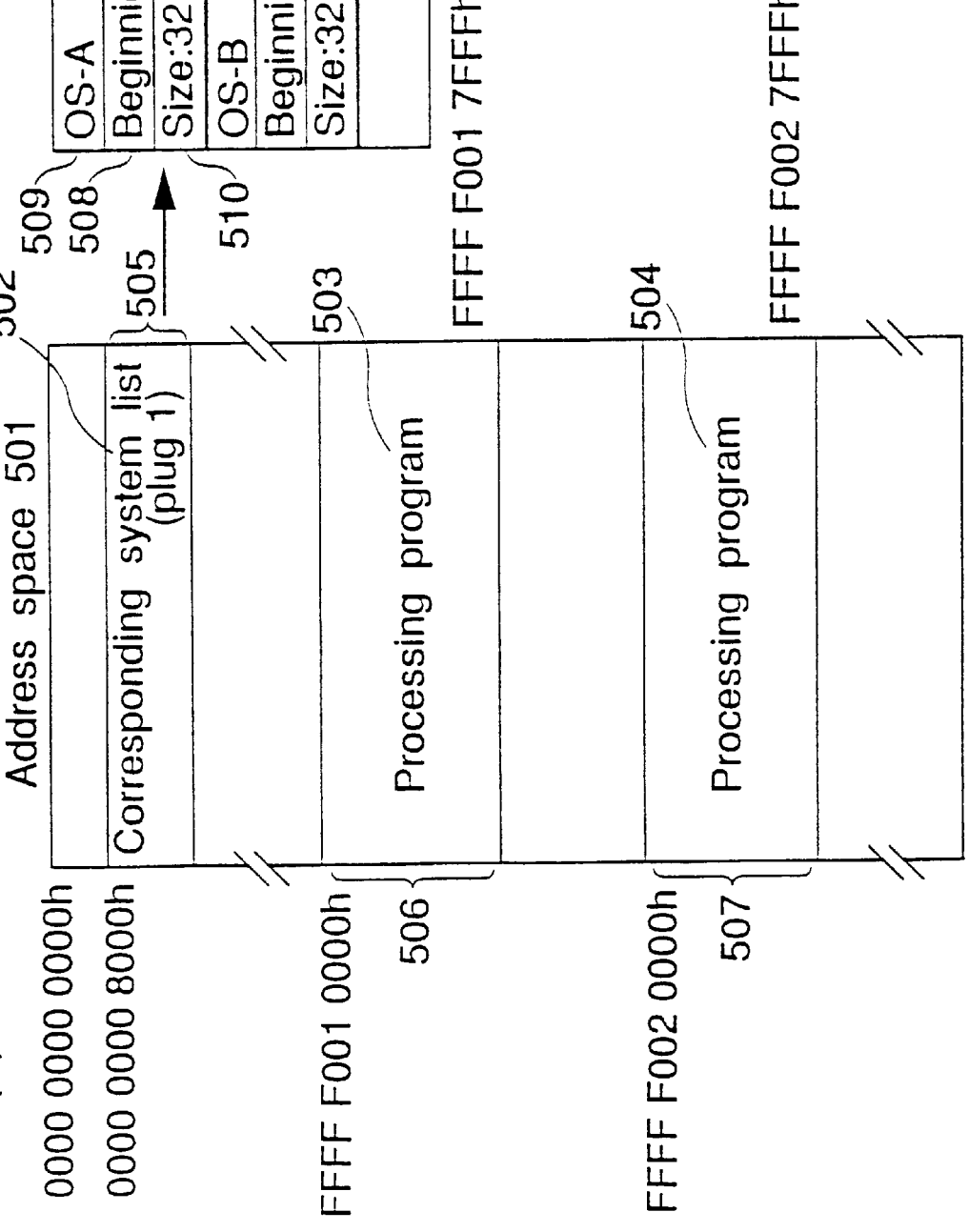
FIG.6(a)
FIG.6(b)

FIG.11(b)

Write response 995

| Transmission destination ID | Packet type | |
|---|---|---|
| Transmission source ID | Result | |
| Not used ||| 
| Header CRC |||

DATA TRANSMISSION APPARATUS, DATA RECEPTION APPARATUS, AND MEDIUM

BACKGROUND OF THE INVENTION

1. Field of the Invention

The present invention relates to data transmission apparatus, data reception apparatus and medium used in transmission or reception of, for example, video data or audio data.

2. Description of the Related Art

Hitherto, as the digital interface for transferring digital video data or audio data, the IEEE 13 94 has been known.

This IEEE1394 is being developed as the interface for multimedia, and is the interface capable of transferring data requesting real-time handling such as video data and audio data within a specific delay time. In this interface, the data is transferred in the unit of packet.

In the IEEE1394, as the identification information for specifying the devices such as terminal and server, there is a concept known as node ID. In this node ID, any value from 0 to 62 can be used, and therefore up to 63 devices can be connected on one bus. In each bus, a bus ID can be added, so that up to 1023 buses can be connected.

The IEEE1394 supports two modes of transfer, that is, isochronous transfer used in transfer of data of which real time must be guaranteed such as video and audio data, and asynchronous transfer used in transfer of data of which guarantee of delay time of transfer is not required. In the isochronous transfer, when the packet is transmitted onto the transmission medium (bus), the channel number is added to the packet for distinguishing the packet from the others, and the transmission and reception of the packet are controlled on the basis of this channel number.

On the other hand, in the IEEE1394, all devices connected to the bus have a virtual 48-bit address space 901. In asynchronous transfer, this address space 901 is mutually read out, and written in, so that data transfer is realized. In part of this address space 901, a register used for the purpose of controlling the operation of each device is contained. The operating state of the device connected to the bus can be checked by reading out the control register of other device, and the device can be controlled by writing in a value in this control register as required.

So far, by using the IEEE1394, it has been attempted to develop the transport stream of MPEG2 (moving picture experts group), and the method of transfer of data of the DV which is the digital VCR(VTR) for household use. In this method, the isochronous transfer is employed in the transfer of video data and audio data.

Besides, for the purpose of controlling transmission and reception of video and audio data, a control register placed in the address space 901 in each device is used. This control register is called the PCR (plug control register). The data transmission apparatus such as server has oPCR 902 as register for output control, and the data reception apparatus such as terminal has iPCR as register for input control. FIG. 12 is a conceptual diagram showing any address space 901 possessed by the data transmission apparatus. In the IEEE1394, in the address space 901 of each device, the beginning address of the oPCR is fixed as FFFFF0000904h. The content of the oPCR 902 is shown in FIG. 13. Channel number 903 shown in FIG. 13 is a concept on transmission medium used in data transmission and reception.

The device for controlling transmission and reception of video and audio data can check the state of transmission or reception by reading out this PCR. It is also possible to instruct to start transmission or reception or to stop by writing into the PCR. When one device transmits or receives plural pieces of video data or audio data simultaneously, plural PCRs may be provided.

FIGS. 14(*a*) to 14(*c*) show formats of packets used in transfer of data of MPEG or DV by using the IEEE1394. FIG. 14(*a*) is a diagram showing the format of packet used in transfer of data.

As shown in the diagram, the packet header 904 in this packet includes the channel 905 of isochronous transfer and the information showing the size of packet (shown as data length 906 in FIG. 14(*b*)) as shown in FIG. 14(*b*). The other CIP header 907, as shown in FIG. 14(*c*), is used for the purpose of compensating for the information lacking in the packet header such as type of data. In the portion consecutive to this CIP header 907, the video data or audio data is contained and transferred.

As shown in FIG. 14(*c*), the format of the transmitted data, that is, the processing method is indicated by FMT 908 of the CIP header 907. That is, from the content of the FMT 908, the MPEG or DV can be identified. The node ID of the transmitting device is indicated by SID 909.

When the device receiving this data checks or controls the state of the transmitting device, first, the node ID of the transmitting device is identified by the SID 909, and the oPCR of the transmitting device is read out. Herein, if the transmitting device has plural oPCRs, by searching the oPCR which is transmitting the channel number being received, the corresponding oPCR can be determined. As a result, by reading out the content of the identified oPCR, the state of transmission is known, or the transmission can be stopped or other control is possible.

The data reception apparatus receiving such video data transmitted in the packet format reads the content of the FMT 908, and distinguishes the processing method of the received data, that is, whether the coding method is MEPG or DV. Then, for example, when the data coding method is judged to be MPEG, the data reception apparatus executes a series of processing such as decoding of the received data, by using the processing method corresponding to MPEG prepared in the memory. Or, using the exclusive processing circuit for MPEG, a series of processing such as decoding is conducted.

In such conventional constitution, however, in order to cope with any processing method (for example, coding method) used in the data transmission apparatus, the processing methods (for example, decoding method) corresponding to all processing methods must be prepared at the data reception apparatus side. It is not a particular problem as far as the variety of processing methods at the data transmission apparatus is small, but as the number of types of processing method at the data transmission apparatus side increases, the number of processing methods to be prepared at the data reception apparatus side increases, and a huge memory capacity is required.

Incidentally, if the video data is processed at the data transmission apparatus side by a completely new processing method not prepared at the data reception apparatus side, the data reception apparatus side, if receiving such video data, cannot process appropriately. Accordingly, in order to always cope with the data processed by new method, the prepared processing methods must be updated and increased frequently at the data reception apparatus side. That is, the scope of capability of processing the received data at the data reception apparatus was limited by the types of the processing methods prepared in the data reception apparatus.

SUMMARY OF THE INVENTION

In view of the problems of such conventional apparatus, it is hence an object of the invention to present data transmission apparatus, data reception apparatus, and medium capable of expanding the scope of processing of received data at the data reception apparatus far wider than in the prior art.

The invention as set forth in claim 1 relates to a data transmission apparatus comprising data transmitting means for transmitting data processed by a specified processing method to a data reception apparatus, storing means for storing a processing method for the data reception apparatus for processing said processed data in the data reception apparatus, identification information adding means for adding identification information showing whether transfer of processing method for said data reception apparatus is possible or not, to said transmission data, and request response means for issuing the processing method for said data reception apparatus, on the basis of the request relating to the processing method for said data reception apparatus which being transmitted from said data reception apparatus receiving said transmission data.

The invention as set forth in claim 10 relates to a data reception apparatus comprising data receiving means for receiving data processed by a specified processing method, and identification information showing whether transfer of processing method for processing said data at reception side is possible or not from a data transmission apparatus, said identification information being added to said data processed by the specified processing method, identifier separating means for separating said added identification information from said reception data, data processing means for processing said reception data, judging means for judging whether said processing by said data processing means is possible or not, and processing method request means for requesting transfer of processing method used in said data processing means about said receiving data to said data transmission apparatus, when said processing is judged impossible by said judging means, and when said separated identifier shows said transfer is possible.

The invention as set forth in claim 12 relates to a medium recording a program for executing the function of the means of whole or part of the means as set forth in any one of the claims, by a computer.

As a result, the processing range of the reception data in the data receiving apparatus is further extended.

BRIEF DESCRIPTION OF THE DRAWINGS

FIG. 6(a) is a conceptual diagram for explaining the constitution of an address space possessed in the data transmission apparatus in the same embodiment.

FIG. 6(b) is an explanatory diagram of a list of corresponding systems.

FIG. 11(b) is a packet structural diagram of write response in the same embodiment.

DESCRIPTION OF THE PREFERRED EMBODIMENTS

Figure 1:
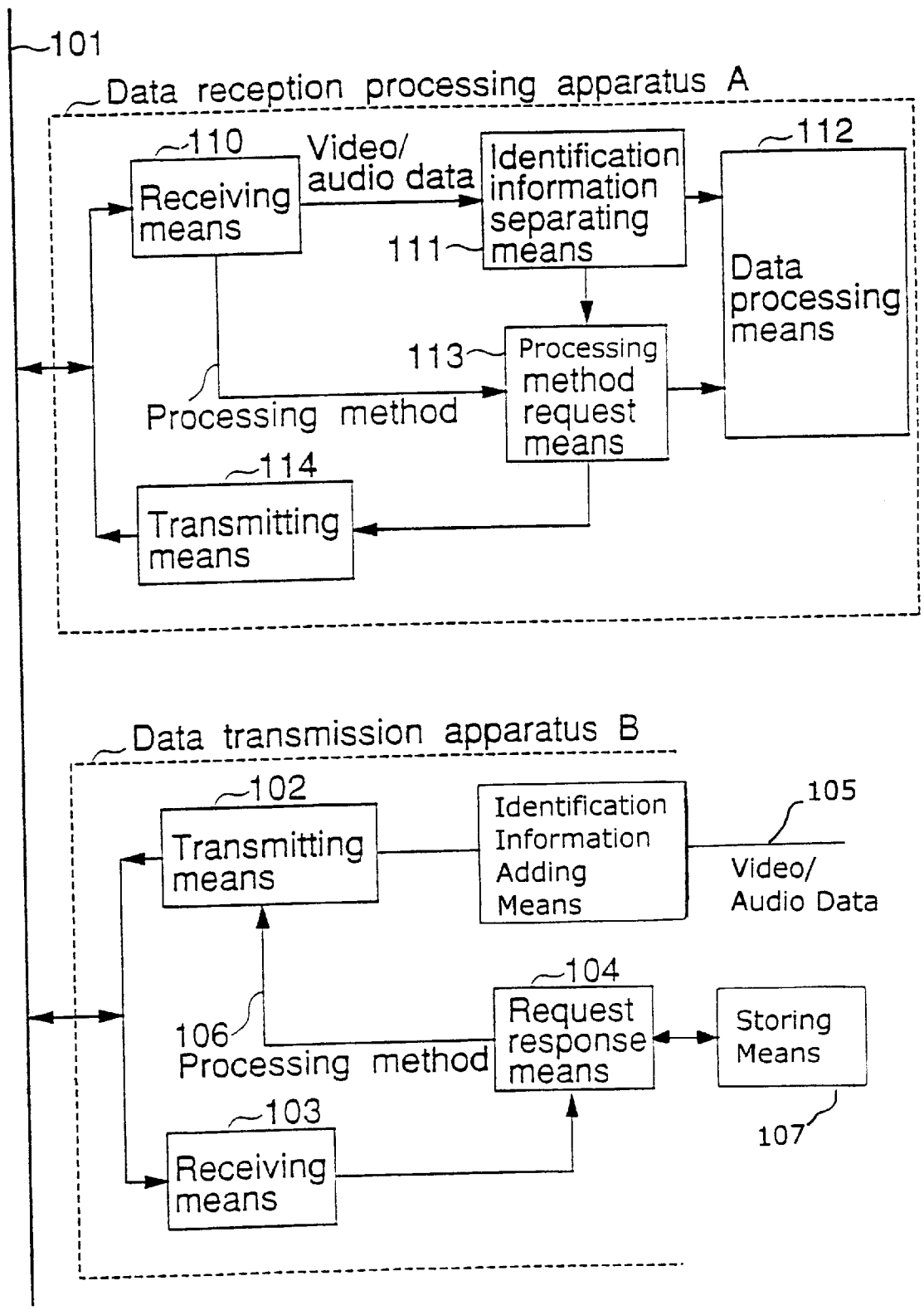
FIG. 1 is a schematic block diagram showing principal parts of data reception processing apparatus and data transmission apparatus in the first embodiment of the invention.

Referring now to the drawings, embodiments of the invention are described below.

(First embodiment)

Figure 2:
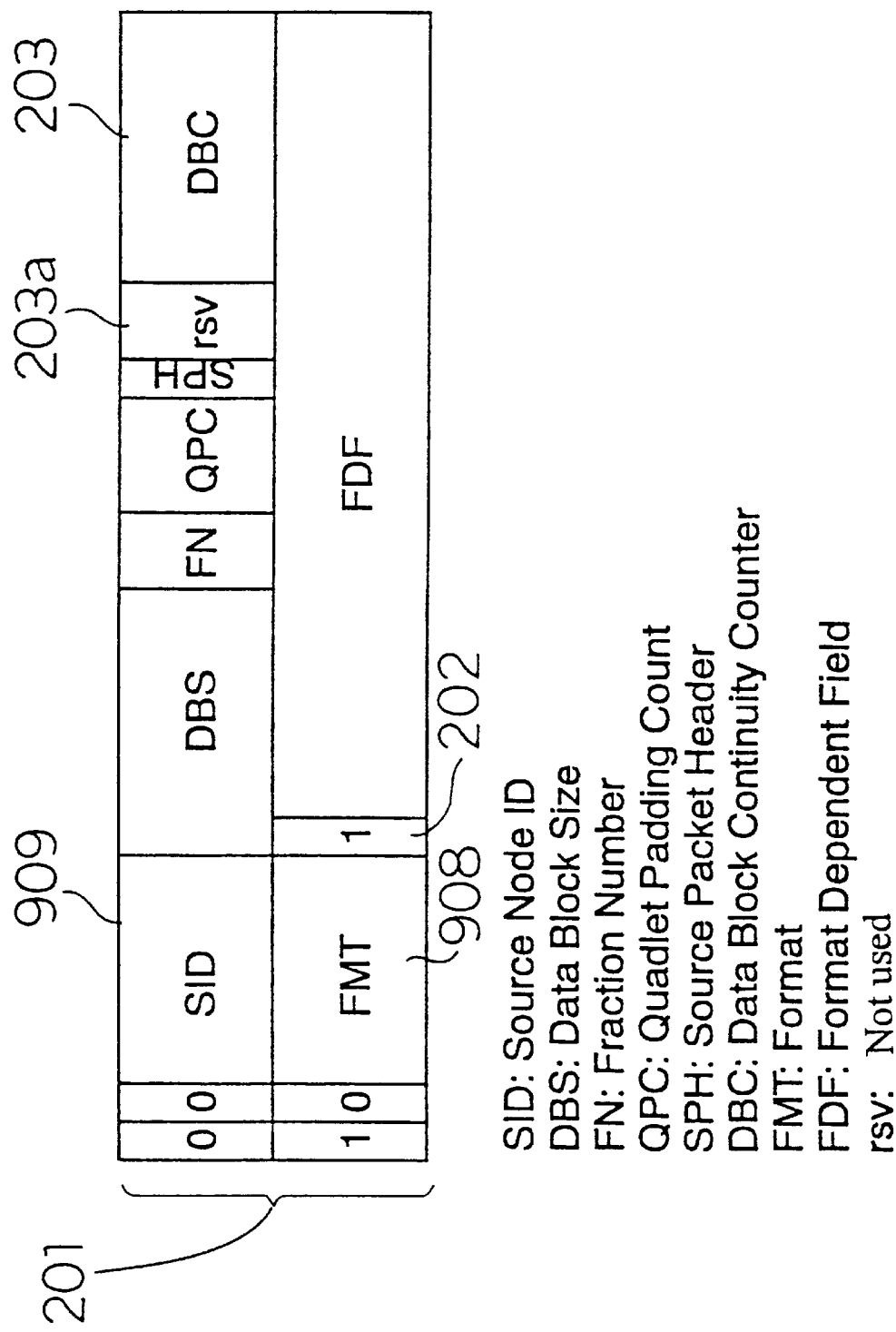
FIG. 2 is a structural diagram of CIP header in a packet in the same embodiment.

In this example, the processing method for transfer is specified by the data transmission apparatus, which is described by referring to FIG. 1 and FIG. 2.

Figure 14A:
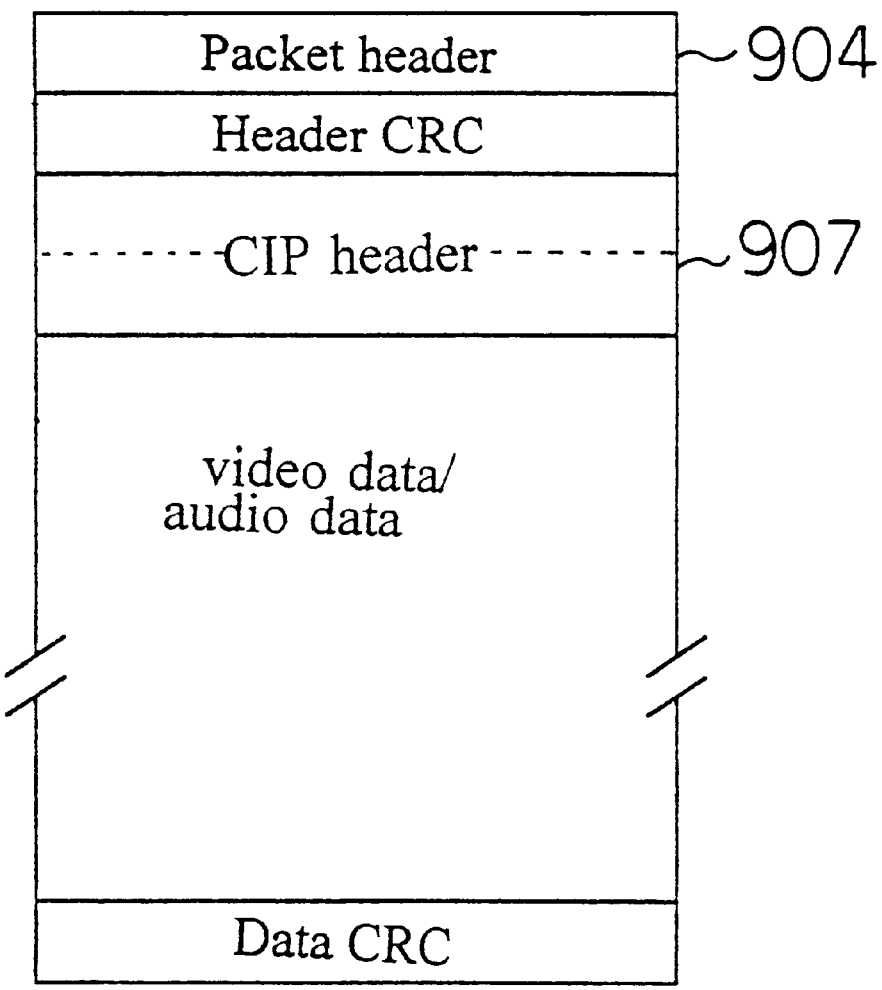
FIG. 14(a) is an explanatory diagram of packet format used in data transfer by conventional apparatus.
Figure 14B:
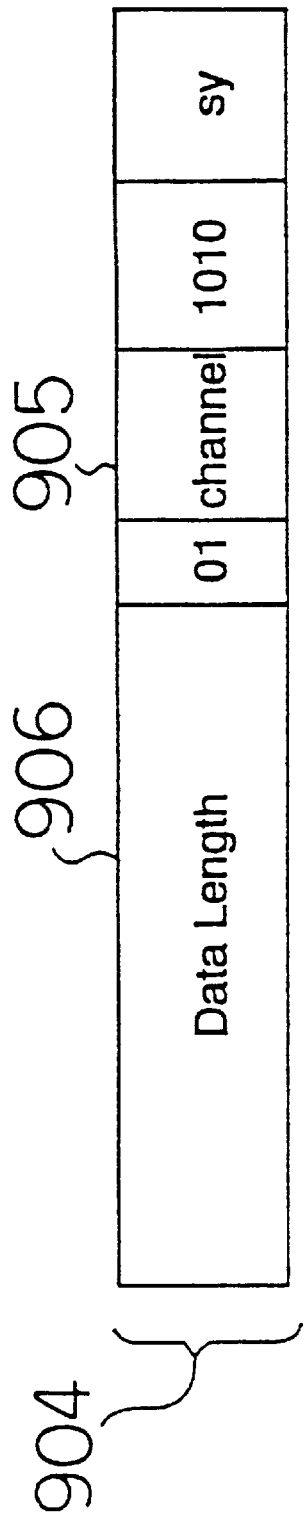
FIG. 14(b) is an explanatory diagram of packet header in packet shown in FIG. 14(a).

FIG. 1 is a schematic block diagram showing principal parts of a data reception processing apparatus A and a data transmission apparatus B of the embodiment, and FIG. 2 is a structural diagram of CIP header 201 about the data transferred in a packet format (see FIGS. 14(a) and 14(b)) from the data transmission apparatus B. Referring to these diagrams, first the constitution of the embodiment is described below.

As shown in FIG. 1, the data transmission apparatus B and data reception processing apparatus A are connected through IEEE1394 as transmission medium 101. In addition to the data transmission apparatus B, plural data transmission apparatuses (not shown) are connected, same as the data transmission apparatus B, to the data reception processing apparatus A through the transmission medium 101.

The data transmission apparatus B is composed of transmitting means 102, request response means 103, receiving means 104, storing means 107 (not shown), and others.

The transmitting means 102 of the data transmission apparatus B is the means for sending out the video data and audio data 105 processed in the data transmission apparatus B, by adding an identifier 202 showing whether it is possible or not to transfer by the processing method mentioned later, to the transmission medium 101. In the invention, meanwhile, the identification information adding means is contained in the transmitting means 102. The receiving means 103 of the data transmission apparatus B is the means for receiving the request packet from the data reception processing apparatus A. The storing means 107 is the means for storing the processing method for the data reception apparatus in order to process the data processed in the data transmission apparatus B in the data reception processing apparatus A. The storing means 107 is not required to prepare the processing methods for the above-mentioned data reception processing apparatus A about all processing methods used in the data transmission apparatus B. The request response means 104 is the means for specifying the processing method 106 to be transferred from the content of the request packet, and issuing to the transmitting means 102.

By contrast, the data reception processing apparatus A comprises receiving means 110, identification information separating means 111, data processing means 112, processing method requesting means 113, and transmitting means 114.

The receiving means 110 of the data reception processing apparatus A is the means for receiving a packet including video data and audio data 105 from the transmission medium 101, and issuing to the identification information separating means 111. When receiving the processing method transferred from the data transmission apparatus B, it is a also the means for issuing it to the processing method request means 113 described later. The identification information separating means 111 is the means for separating identification information contained in the CIP header 201, including identifier 202 which shows whether it is possible or not to transfer the processing method for data reception processing apparatus, from the data packet sent from receiving means 110 and issuing each information. The processing method request means 113 is the means for judging the type of the data being received according to FMT 908 (see FIG. 2) of the data being received, and judging whether possible or not to transfer the processing method for the data reception processing apparatus from the identifier 202, and further instructing proper processing method of data to the data processing means 112. Moreover, the processing method request means 113 is also the means, in case the type of data is not defined yet, for issuing a transfer request of processing method to the transmitting means 114 depending on the content of the identifier 202. The transmitting means 114 is the means for transmitting the transfer request to the data transmission apparatus B.

In the constitution thus described, the operation of this embodiment is described below by reference to FIG. 1 and FIG. 2.

Figure 14C:
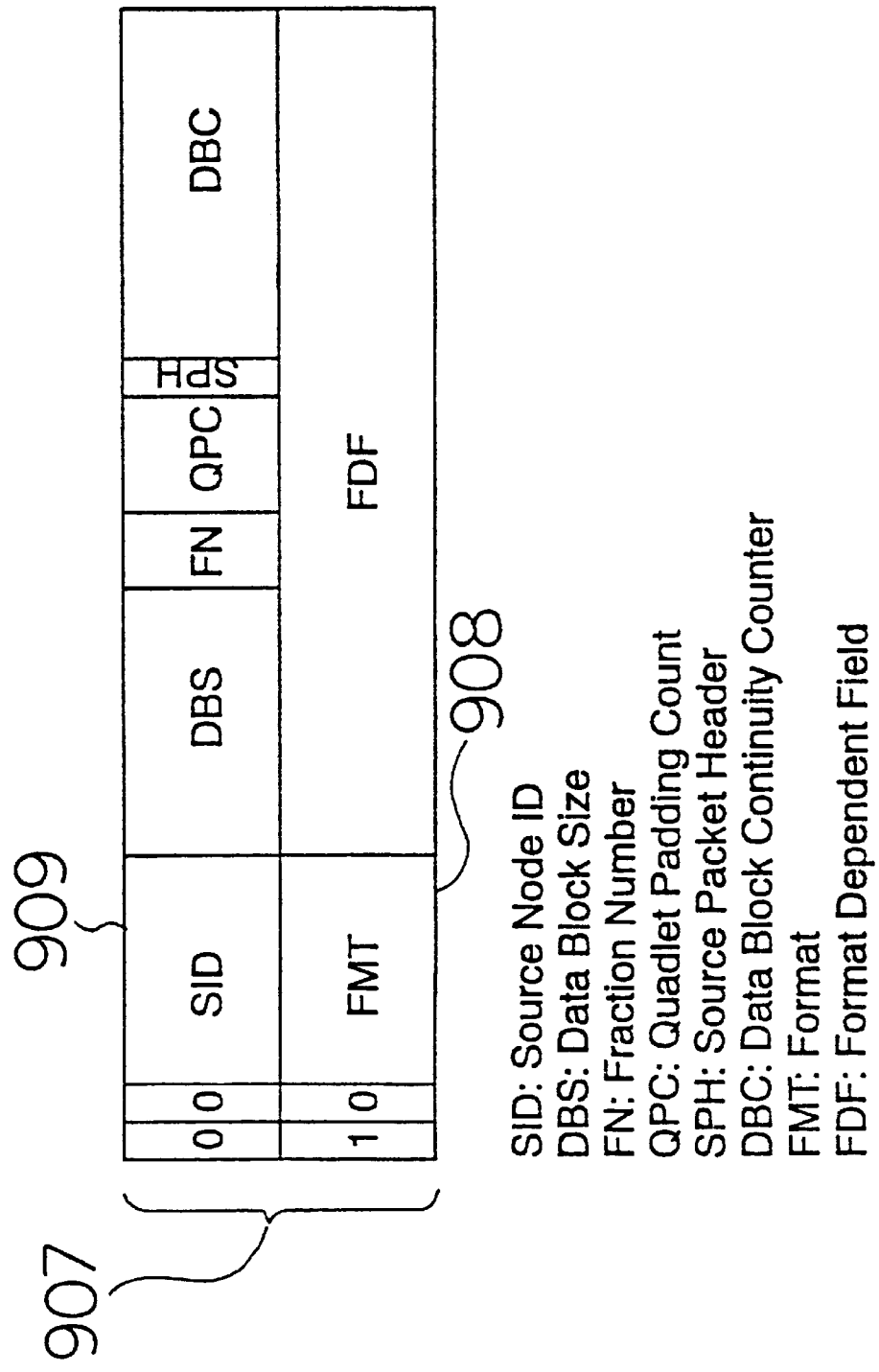
FIG. 14(c) is an explanatory diagram of CIP header in packet shown in FIG. 14(a).

First, the transmitting means 102 of the data transmission apparatus B sends out the specifically processed video data and audio data 105 to the transmission medium 101. In this case, the processed video data and audio data 105 are transmitted in packet format. This packet format is basically same as the packet format shown in FIG. 14(a) to (c), except that an identifier 202 (see FIG. 2) is newly added in the CIP header 201. The above-mentioned identifier 202 may be composed to show whether transfer of processing method is possible or not, by using, aside from the field shown in FIG. 2, for example, rsv203a as other field of the CIP header 201. Also, by FMT 908, it is possible to show that a new processing method may be used and the transfer of processing method is possible as well.

On the other hand, the receiving means 110 of the data reception processing apparatus A receives a packet containing video data and audio data 105 from the transmission medium 101, and issues to the identification information separating means 111. The identification information separating means 111 separates the video data and audio data, and the identification information added to them, from the reception data issued from the receiving means 110, and issues the video data and audio data to the data processing means 112, and the identification information to the processing method request means 113, respectively. Herein, the identification information separated from the reception data by the identification information separating means 111 corresponds to the information contained in the packet header 904 shown in FIG. 14(b), and the CIP header 201 shown in FIG. 2. That is, it contains the channel number 905 (see FIG. 14(b)) of the data received by the data reception processing apparatus A, the identifier 202 newly added in this embodiment, FMT 908 indicating the type of data, and SID 909 (see FIG. 2) which is the node ID of the data transmission apparatus B as the data transmission source, among others.

The processing method request means 113 judges the type of the received data from the FMT 908 of the data being received, that is, if the data is processed in the MPEG format or processing in DV format, or if the data is processed by a method not defined for the data reception processing apparatus A, and thus the processing method employed at the data transmission apparatus side is judged.

Suppose this result of judgement shows processing in MPEG format, and when the corresponding processing method is prepared in the data reception processing apparatus A, the corresponding processing method is instructed to the data processing means 112, and processing is done as usual.

However, if the processing method request means 113 judges that the type of the data indicated by the FMT 908 is not defined in the data reception processing apparatus A, without processing the data, it is instructed to the data processing means 112 to discard the data being received. It hence prevents wrong processing by employing incorrect processing method.

Along with such action in the case of receiving an undefined FMT, further, the processing method request means 113 operates as follows.

In the case of this embodiment, as shown in FIG. 2, the identifier 202 is "1". It shows possibility of transmission of processing method for use at the reception side, corresponding to the processing method employed in processing of transmission data in the data transmission apparatus B. The identifier 202 is added, as mentioned above, by the transmitting means 102 of the data transmission apparatus B.

Herein, the processing method request means 113 recognizes that the identifier 202 is "1", and issues request of processing method to the transmitting means 114.

Incidentally, if the identifier 202 is "0", it means impossible to transmit the processing method for use at the reception side, corresponding to the processing method employed in processing of transmission data at the data transmission apparatus B. That is, if the processing method for data reception processing apparatus is not prepared in the data transmission apparatus B, the data is transmitted by adding "0" as the identifier 202.

Back to the description of the operation of the data reception processing apparatus A, in this embodiment, the processing method of the received FMT 908 is the data of unknown type for the data reception processing apparatus A, and the identifier 202 shows that transfer of processing method is possible, and hence, as mentioned above, the request for processing method is issued from the transmission apparatus 114 to the data transmission apparatus B. The processing method requested herein corresponds to the program for processing the data by the processing means. The data processing means 112 can process adequately, even in the case of video data or audio data processed by unknown processing method issued from the identification information separating means 111, by using the processing programs transmitted from the data transmission apparatus B as described later, depending on the transfer request.

Figure 3:
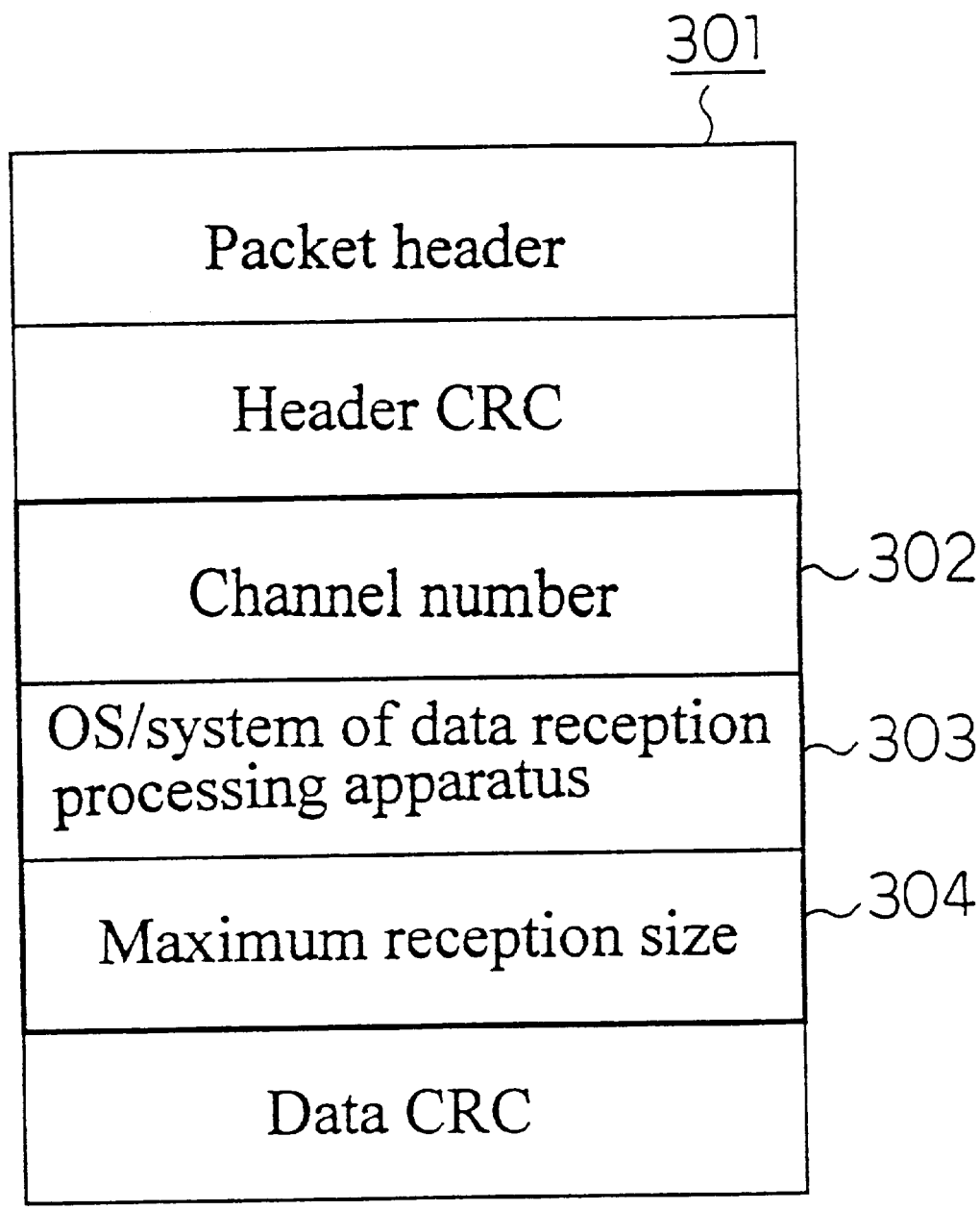
FIG. 3 is a structural diagram of a request packet in the same embodiment.

Referring now to FIG. 3, the content of the packet used in the case of requesting the processing method from the data reception processing apparatus A is described in detail. FIG. 3 is a structural diagram of a request packet 301 sent from the data reception processing apparatus A to the data transmission apparatus B.

When requesting such processing method, the request parameters may include channel number 302 of isochronous transfer being received, OS and system identification information 303 of the data reception processing apparatus A, and maximum reception size 304 as the magnitude of the data that can be received at once, among others. Herein, the OS and system identification information correspond to the situation of the system of the data reception apparatus of the invention. Instead of the channel number 302, for example, the PCR number mentioned above may be also specified.

Herein, the necessity of using above OS and system identification information 303 as the parameter is explained. That is, although the data processing means 112 is usually realized by the CPU or DSP, the required processing program may vary with the type of the CPU or DSP, or the OS installed. In other words, if the processing method employed at the data transmission apparatus B side is the same method, the corresponding processing method may differ depending on the system condition of the data reception processing apparatus A side. Therefore, the OS and the system identification information 303 may be specified as parameters so that the adequate processing program corresponding to the OS of the data reception processing apparatus A may be judged by the data transmission apparatus B.

Moreover, in the devices for transmitting and receiving data, generally, it is sometimes necessary to transmit or receive data by dividing into small units, depending on the buffer capacity for transmission or reception. Accordingly, as shown in FIG. 3, the maximum reception size capable of transferring at once is specified. Thus, the transmitting means 114 transmits the determined request packet 301 to the transmission medium 101.

The operation of the data transmission apparatus B is mainly described below while referring to FIG. 1.

The receiving means 103 of the data transmission apparatus B receives the request packet 301 about the above processing method from the transmission medium 101, and issues it to the request corresponding means 104. The request corresponding means 104, when receiving the request packet 301, selects the processing program 106 suited to the OS or system of the data reception processing apparatus A from the storing means 107, and issues to the transmitting means 102. The transmitting means 102 of the data transmission apparatus B sends it out to the transmission medium 101.

On the other hand, as mentioned above, the processing program transferred from the data transmission apparatus B is received by the receiving means 110 of the data reception processing apparatus A, and is sent to the data processing means 112 through the processing method request means 113, and is utilized in data processing. Though variable with the size of the entire processing program, usually, the program is transferred in divided portions. That is, the processing program is transferred in plural times, depending on the maximum reception size 304 indicated by the request packet 301 issued by the processing method request means 113.

In such a case, when dividing one processing program and transferring in plural times, the transfer may be controlled either at the data transmission apparatus side or at the data reception processing apparatus side.

Figure 9:
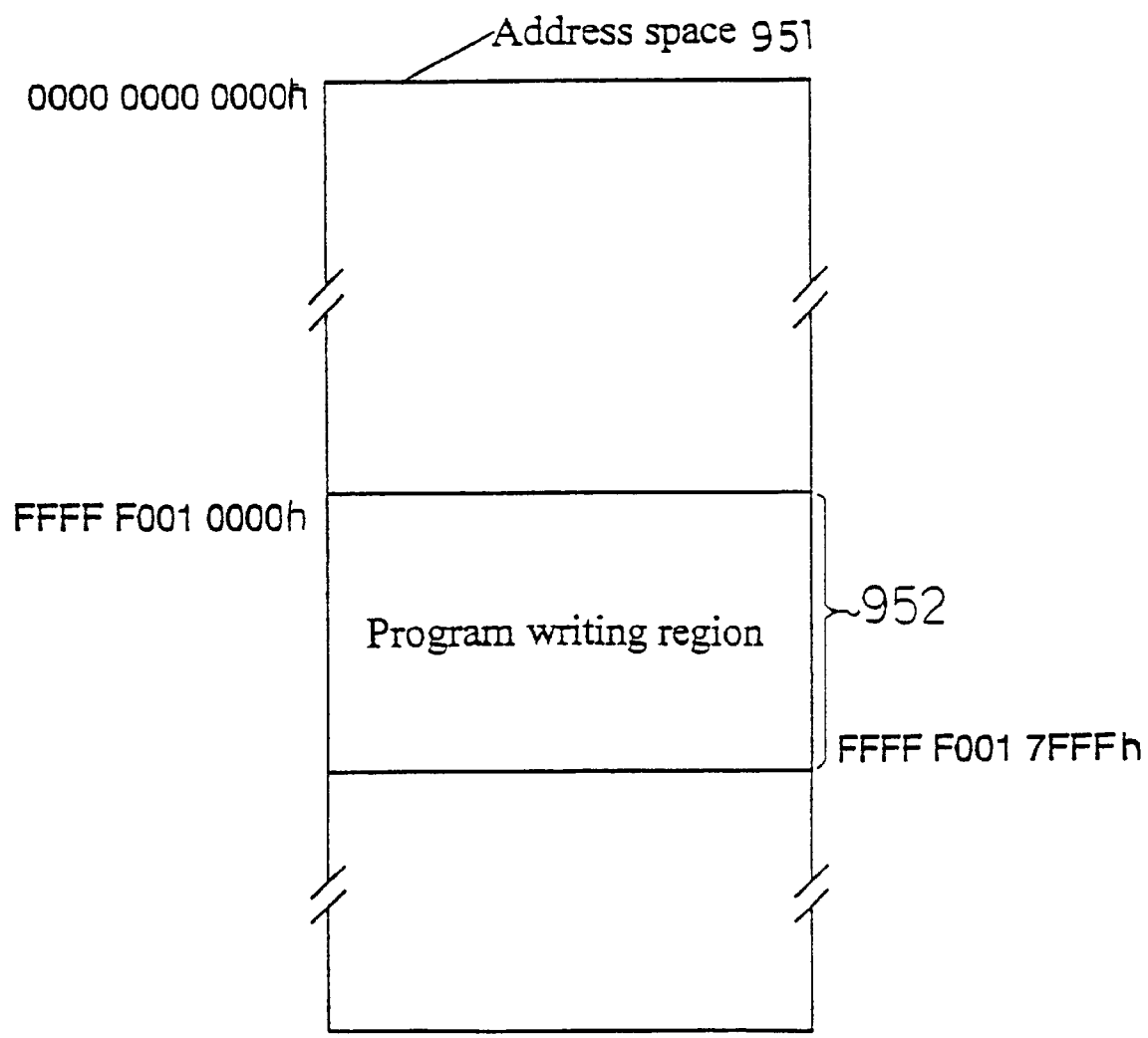
FIG. 9 is a conceptual diagram for explaining the constitution of address space in a data reception processing apparatus in other embodiment of the invention.

In the former case, the writing destination address of each processing program divided in plural times to be transferred (corresponding to the address in the address space 951 shown in FIG. 9 in a second embodiment below) may be specified under the control of the request response means 104 of the data transmission apparatus B. That is, in this case, the data transmission apparatus divides the processing program, transfers by determining the transfer sequence, and also controls re-transmission, etc.

In the latter case, for example, the address for reading out each processing program divided in plural times to be transferred, from the source of storing (corresponding to the address in the address space 501 shown in FIG. 6(a) in the second embodiment below) may be specified under the control of the processing method request means 113 of the data reception processing apparatus A. That is, in this case, the data reception processing apparatus A divides the processing program, transfers by determining the transfer sequence, and also controls re-transmission, etc. Meanwhile, the request response means 104 may not always have the processing program corresponding to the OS or system of the data reception processing apparatus A even if the identifier 202 is "1" telling it is possible to transfer the processing method. Therefore, if the request response means 104 judges that there is no processing program corresponding to the data reception processing apparatus A, the response showing that the processing program cannot be transferred is returned. When the receiving means 110 of the data reception processing means A obtains such response, the processing method request means 113 issues the instruction not to process the data to the data processing means 112.

Thus, according to the embodiment, the data reception processing apparatus A prepares only limited processing methods out of the processing methods corresponding to the processing methods employed in the data transmission apparatus B, and if the processing method of the received FMT 908 is data of unknown type for the data reception processing apparatus A, the processing method can be requested as far as the identifier 202 indicates that the transfer of such processing method is possible, so that adequate processing is done. If the identifier 202 indicates that the transfer of processing method is impossible, wasteful action of useless request can be avoided.

(Second embodiment)

In this embodiment, the data reception apparatus specifies the processing method to be transferred, as explained by referring to the accompanying drawings.

Figure 4A:
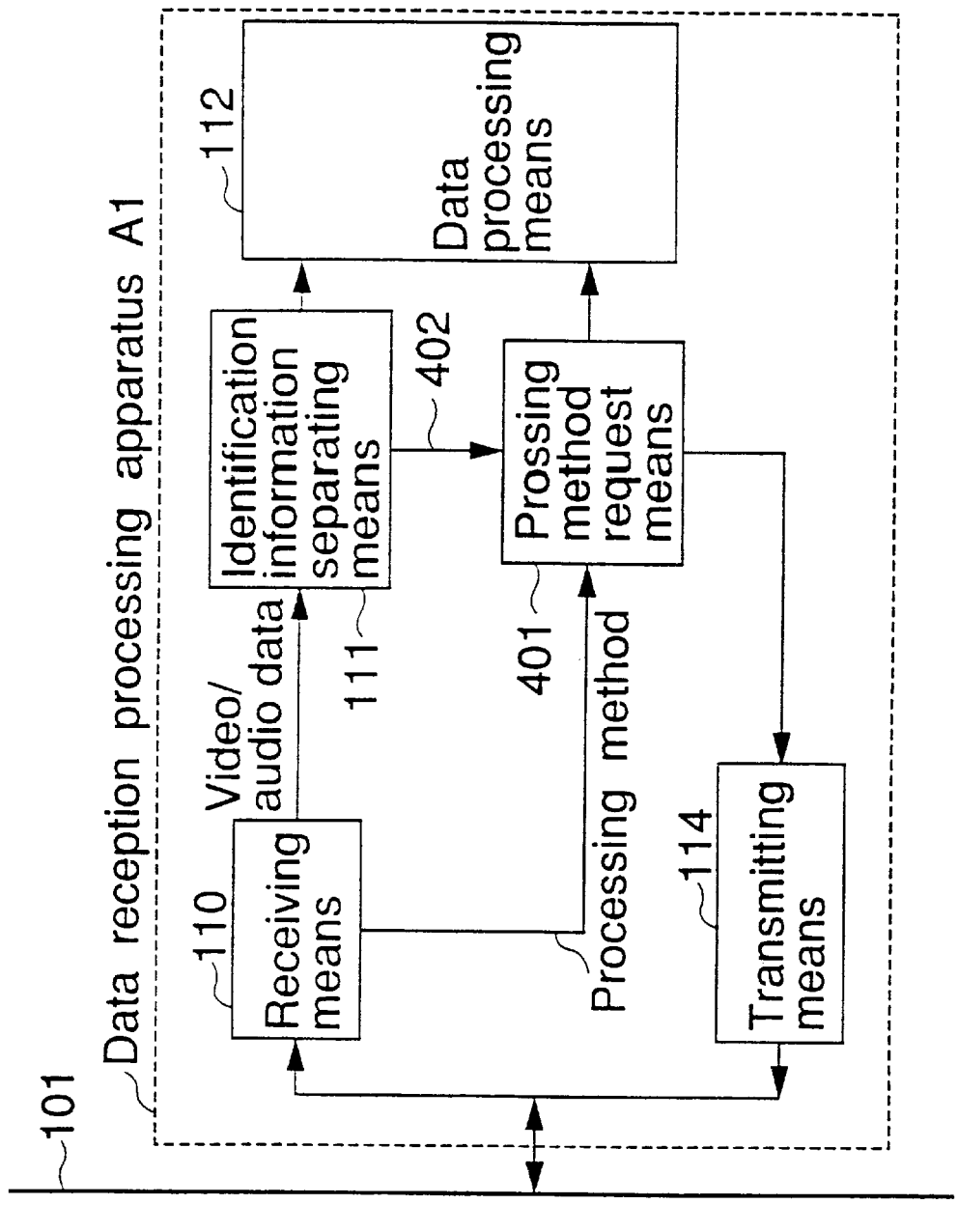
FIG. 4(a) is a block diagram showing a constitution of a data reception processing apparatus in the second embodiment of the invention.
Figure 4B:
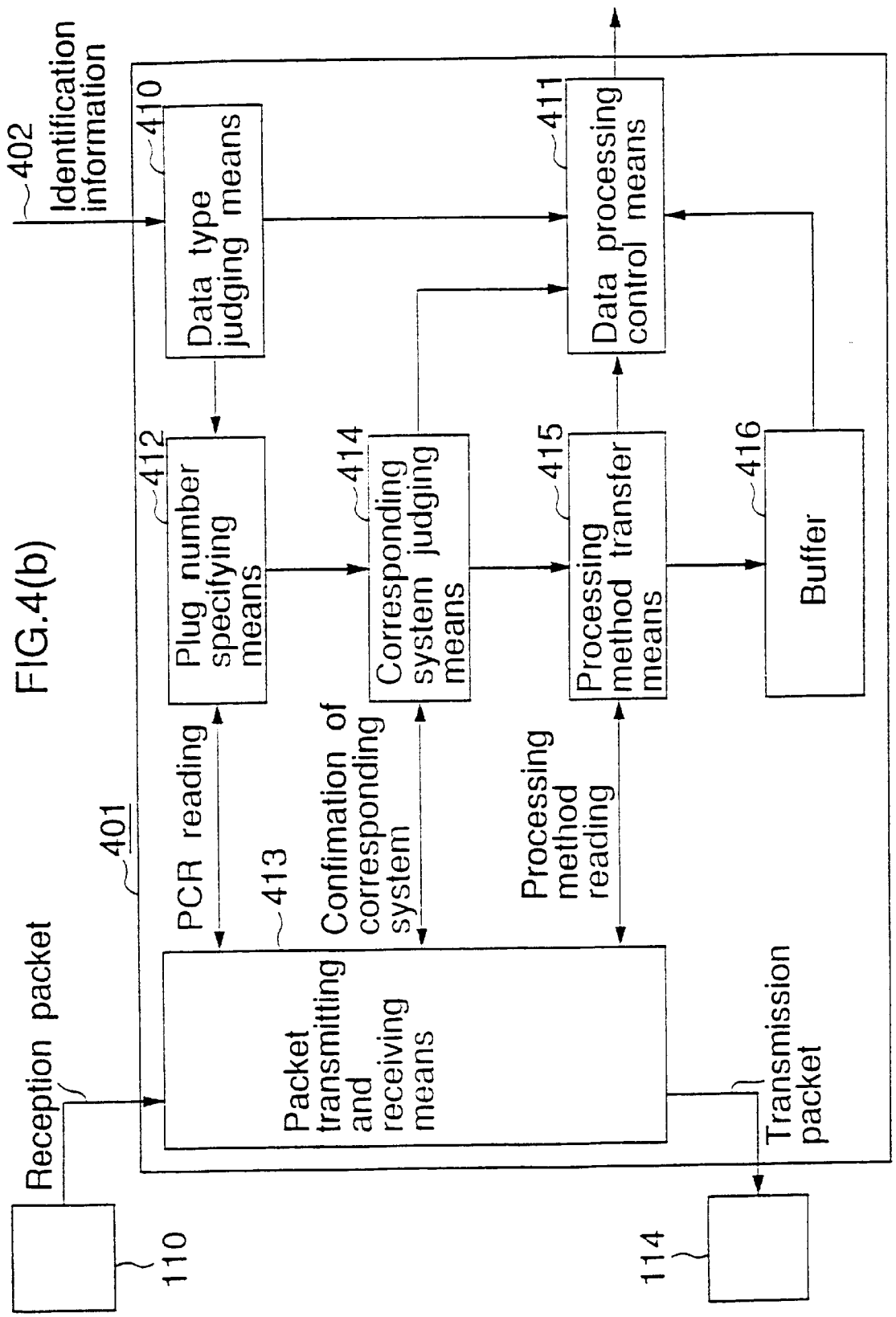
FIG. 4(b) is a block diagram showing a constitution of processing method request means of the data reception processing apparatus in the second embodiment of the invention.

FIG. 4(a) is a schematic block diagram showing principal parts of a data reception processing apparatus A1 in the embodiment, and FIG. 4(b) is a block diagram showing a constitution of processing method request means 401 provided inside of the data reception processing apparatus A1. Referring to these drawings, first, the constitution of the embodiment is described below. Those basically same as in the data reception processing apparatus A and data transmission apparatus B of the first embodiment explained in FIG. 1 and others are identified with same reference numerals and their description is omitted. Same as shown in FIG. 1, the data transmission apparatus B1 and data reception processing apparatus A1 are connected through IEEE1394 as transmission medium 101.

In this embodiment, since the data reception processing apparatus A1 specifies the processing method to be transferred, and therefore the constitution of the processing method request means 401 is different from that of the preceding embodiment. Therefore, referring to FIG. 4(b), the constitution of the processing method request means 401 is mainly described below.

Figure 12:
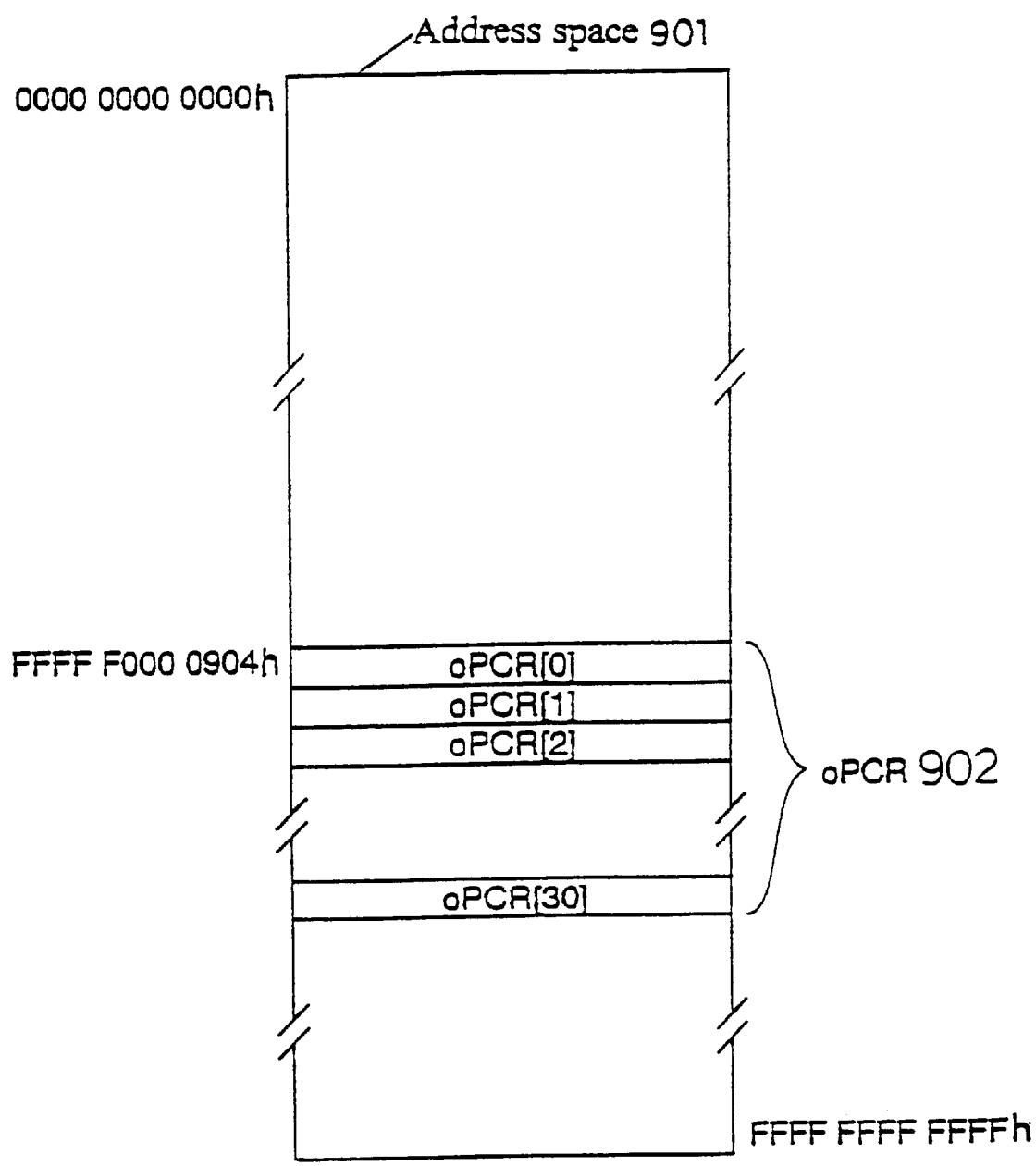
FIG. 12 is a conceptual diagram showing a constitution of address space possessed in data transmission apparatus.
Figure 13:
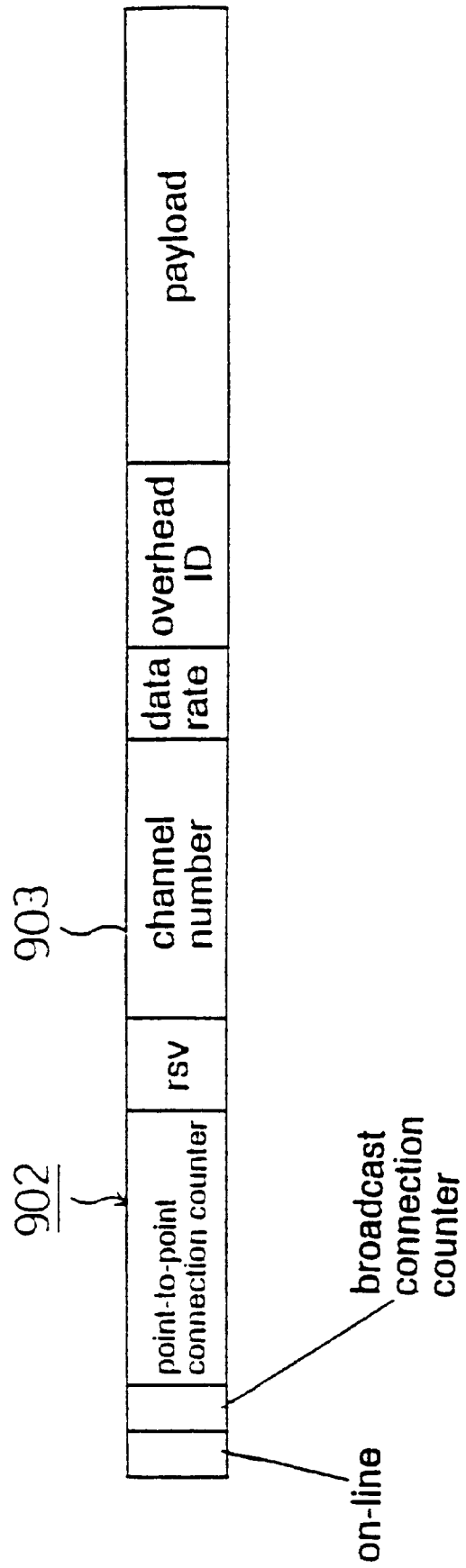
FIG. 13 is an explanatory diagram showing the content of oPCR of address space possessed in data transmission apparatus.

In the drawings, data type judging means 410 is the means for issuing an instruction for executing or stopping the data processing to the data processing control means 411, on the basis of the identification information 402 separated by the identification information separation 111, or issuing the content of the identification information to plug number specifying means 412. The data processing control means 411 is the mans for controlling processing of reception data in the data processing means 112. The plug number specifying means 412 is the means for reading out the oPCR 902 (see FIG. 12) of the data transmission apparatus B1 which is the transmission source of the data received by the data reception processing apparatus A1. Packet transmitting and receiving means 413 is the means for transmitting and receiving packets with the receiving means 110 and transmitting means 114, and is also the means for exchanging data with specified means of the processing method request means 401 as shown in the drawing. Corresponding system judging means 414 is the means for specifying the processing method to be transferred. Processing method transfer means 415 is the means for executing to read out the processing method to be transferred. A buffer 416 is the means for temporarily storing the processing method transferred in a separated state from the data transmission apparatus B1.

In the embodiment, request and transfer of the processing method are different from that in the foregoing embodiment as follows: in addition to the use of the oPCR 962 (see FIG. 12) in the address space 501 possessed in the data transmission apparatus B1, further as shown in FIGS. 6(a) and 6(b), in this address space 501, a storing region 505 of a list 502 of corresponding systems mentioned below, and storing regions 506, 507 of processing programs 503, 504 are defined, and they are read out to execute such request and transfer. FIG. 6(a) is a structural diagram of the address space 501 possessed in the data transmission apparatus B1 in the embodiment, and FIG. 6(b) is an explanatory diagram of the list 502 of corresponding systems. Referring now to FIGS. 6(a) and 6(b), the composition of the address space 501 possessed in the data transmission apparatus B1 and the list 502 of corresponding systems is described specifically.

While the data transmission apparatus B1 is transmitting the specified processed data to the data reception processing apparatus side by using the oPCR 902 (not shown) of the plug number 1 on the address space 501, as shown in FIG. 6(a), the list 502 of corresponding systems is stored in the region 505 determined by the plug number 1 (in the diagram, the beginning address of the region 505 is 000000008000). This list 502 of corresponding systems is a list of information (see FIG. 6(b)) including the beginning address 508 in which the processing program for data reception processing apparatus prepared in the data transmission apparatus B1 is stored, the type 509 of the system (OS) corresponding to the processing program, and the size 510 of the processing program. As shown in FIG. 6(a), on the address space 501, the processing programs 503, 504 are stored in the corresponding regions 506, 507. In this diagram, it shows there are two processing programs corresponding to the specified processing method that can be transferred by the data transmission apparatus B1. That is, corresponding to the OS at the data reception processing apparatus side of OS-A, and the processing program 503 or corresponding to the processing program 504 of OS-B, each processing program is stored in a size of 32K bytes. As described above, such information is written in the list 502 of corresponding systems as shown in FIG. 6(b). The composition of such address space 501 is same in other plug numbers.

The data transmission apparatus B1 can prepare processing programs for each data reception processing apparatus if one processing method used in transmission corresponds to plural processors or OSs. It can also prepare only a processing program that can be used only in the data reception processing apparatus using a specific OS.

As clear from the description herein, in this embodiment, the data transmission apparatus B1 also differs from that in the preceding embodiment that the processing program of the data being transmitted is put on the address space 501 that can be read out from outside, that is, the data reception processing apparatus side, whereas its address and size of processing program are put on the address as the list 502 of corresponding systems.

In this constitution, the operation of the embodiment is described below while referring to the drawings.

In FIG. 4(b), the data type judging means 410, when obtaining the identification information 402 from the identification information separating means 111, first judges if the data being received is of known type or not, from the value of the FMT 908 contained in the CIP header 201 (see FIG. 2), and when judged to be, for example, known type, it issues the instruction to change over to the corresponding processing method to the data processing control means 411. If judged to be unknown type, on the other hand, it issues an instruction to stop processing. If the identifier 202 contained in the CIP header is "1", showing the processing method can be requested, it issues the SID 909 (see FIG. 2) which is the node ID of the data transmission apparatus B1 and the channel number being received 905 (see FIG. 14(b)) to the plug number specifying means 412.

The plug number specifying means 412, when the node ID of the data transmission apparatus B1 is entered from the data type judging means 410, reads out each oPCR 902 of the data transmission apparatus B1, and identifies the oPCR 902 responsible for transmission of channel number of the data being received in the data reception processing apparatus A1, and sends the result of identification to the corresponding system judging means 414. In this identifying process, since the channel number used in transmission is recorded in each oPCR 902, it is utilized. Reading of the oPCR is realized by asynchronous transfer of the IEEE1394.

The operation of the plug number specifying means 412 is described in further detail below.

Figure 5A:
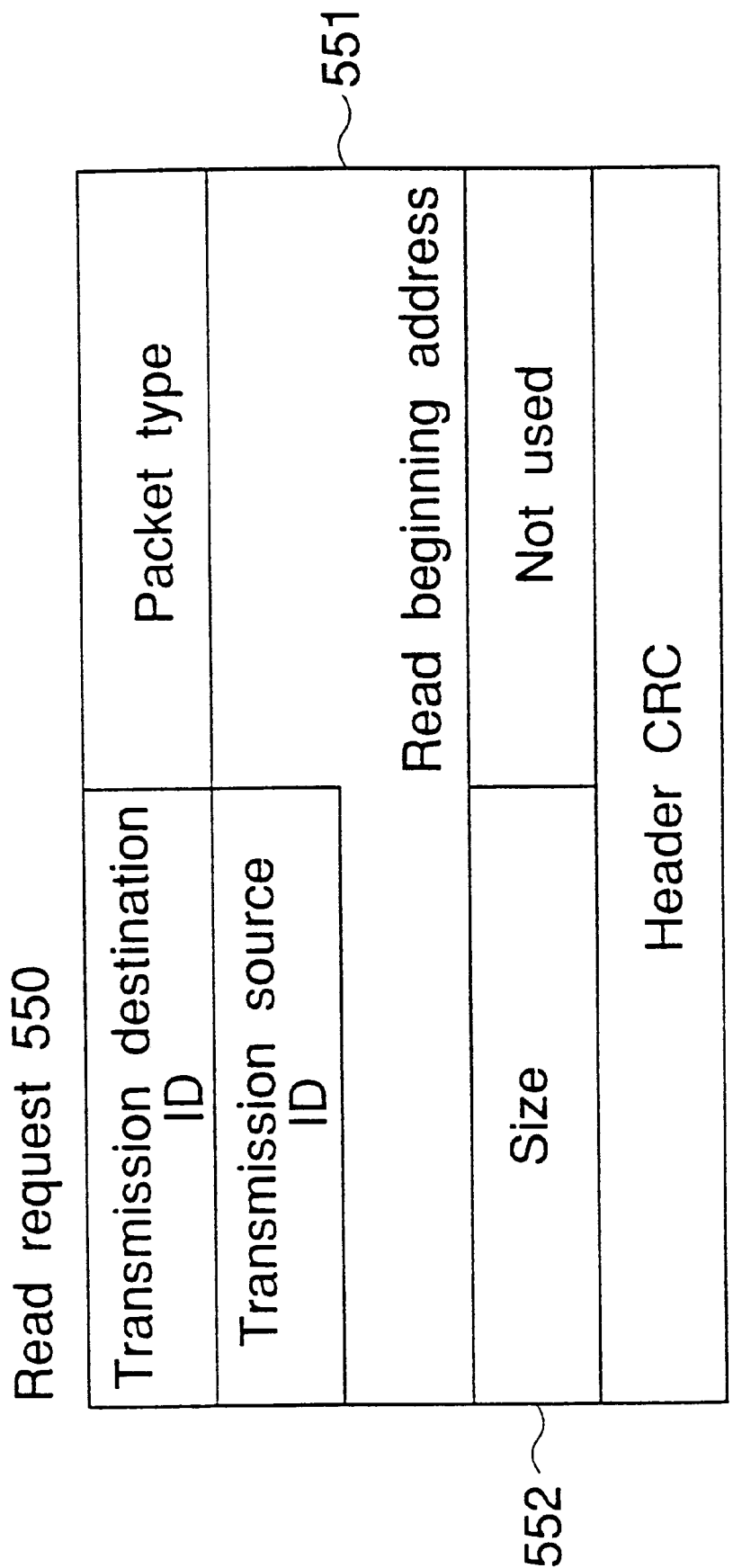
FIG. 5(a) is a packet structural diagram of read request in the same embodiment.

First, the plug number specifying means 412 issues a read request 550 (see FIG. 5(a)) of a specific region of which beginning address is the address of FFFFF0000904 (see FIG. 12) of oPCR of the data transmission apparatus B1 determined by the node ID, to the packet transmitting and receiving means 413, and this packet transmitting and receiving means 413 forms a packet for asynchronous communication, and issues to the transmitting means 114.

Figure 5B:
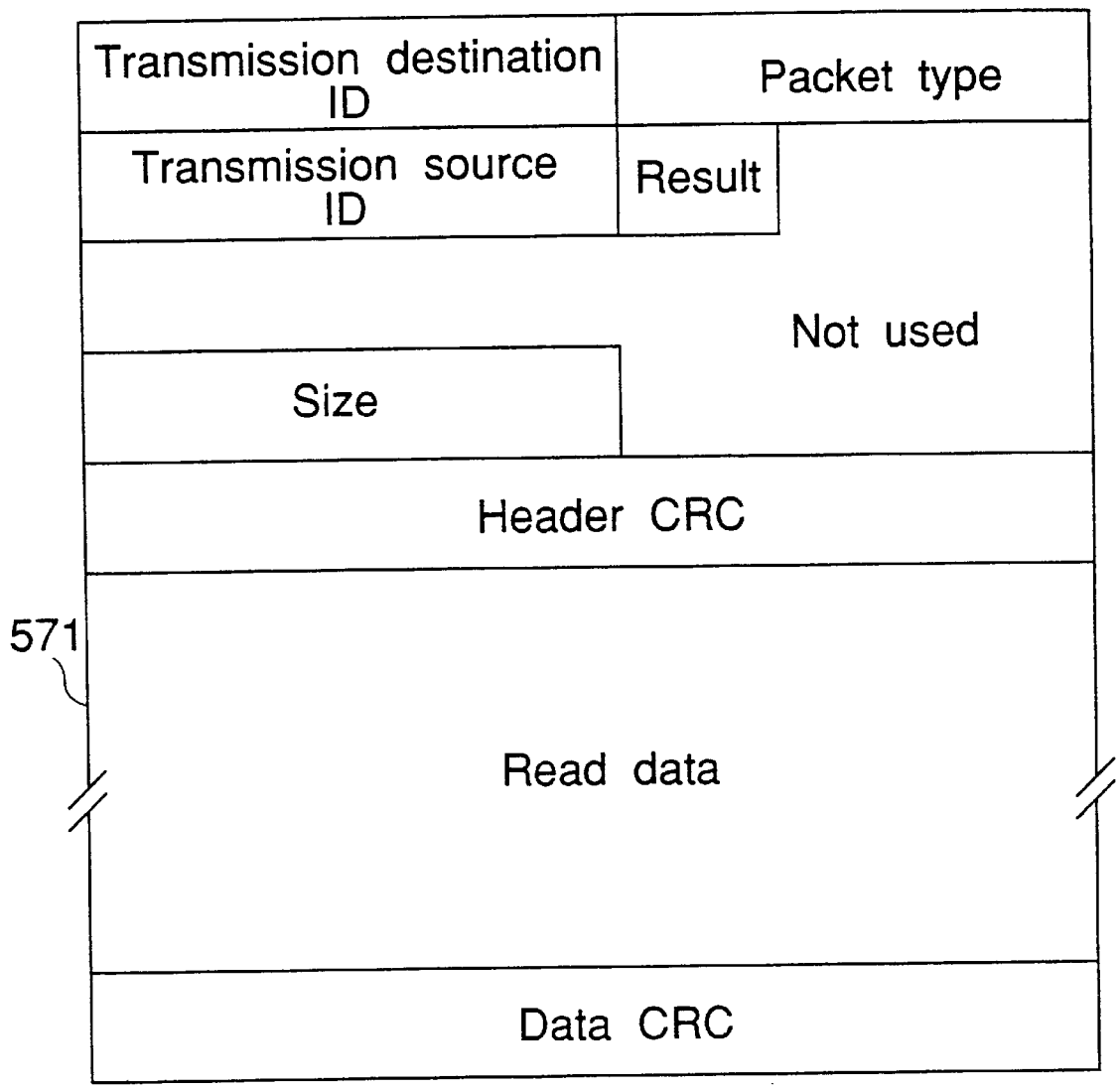
FIG. 5(b) is a packet structural diagram of read response in the same embodiment.

FIG. 5(a) is a diagram showing the composition of packet 550 of read request, which contains read beginning address 551, read size 552, and other information. The read size 552 is the read request size. FIG. 5(b) is a diagram showing the composition of the packet 570 of read response from the data transmission apparatus corresponding to the packet 550 of the read request in FIG. 5(a), and it includes the information of read data 571 and others.

The read request packet 550 and read response packet 570 are packets used in transfer request and response shown in FIG. 7 and FIG. 10 later.

By these packets, it is possible to read and write the address space of each node. This read request packet 550 is also used in reading of oPCR, reading of corresponding system list, and reading of processing program.

The following is a series of explanation from reading of oPCR to reading of corresponding system list and reading of processing program.

That is, the packet transmitting and receiving means 413 receiving the result to the read request transmitted from the data transmission apparatus B1 from the receiving means 110 issues the read value of each oPCR to the plug number specifying means 412. In reading of oPCR, all oPCRs can be read at once, or may be divided in plural times.

On the basis of the transmission channel number contained in the oPCR obtained thus from the reading result, the data reception processing apparatus A1 specifies the number of the oPCR of the data transmission apparatus B1, and sends the number data of the specified oPCR to the corresponding system judging means 414 together with the node ID of the transmission apparatus B1.

On the other hand, the corresponding system judging means 415 obtaining the output from the plug number specifying means 412 operates to read out the corresponding system list 502 (see FIG. 5(b)) prepared in the data transmission apparatus B1.

The corresponding system list 502 is a list of corresponding systems of the processing programs prepared in the data transmission apparatus B1 placed at the address determined by the plug number as stated above.

This corresponding system list 502 can be read out by the same operation as the reading of the oPCR 902 by the plug number specifying means 412 mentioned above.

The corresponding system judging means 414, by reading the corresponding system list 502, judges if the processing program usable in the data processing means 112 is present or not among plural processing programs prepared in the data transmission apparatus B1, and specifies the usable processing program. In this way, after specifying the processing program, the corresponding system judging means 414 sends the address of the processing program listed in the corresponding system list 502, the size of this processing program, and the node ID of the data transmission apparatus holding this processing program to the processing method transfer means 415.

Incidentally, the node ID can be also contained together with the address of the processing program listed in the corresponding system list 502. As a result, the processing program can be prepared in the node other than the transmission apparatus B1.

The processing method transfer means 415, using the address specified from the corresponding system judging means 414, requests transfer of the specified processing program to the data transmission apparatus B1. The operation of transfer request by the processing method transfer means 415 is further described by referring to FIG. 7.

As mentioned above, the transfer unit 510 of the processing program that can be transmitted from the data transmission apparatus B1 can be also contained in the corresponding system list 502.

That is, by specifying the maximum size of the packet that can be transmitted in the case of transfer of processing program in the corresponding system list 502, adequate transfer of processing program is realized. The data reception processing means A1 transfers the processing program, by dividing in plural times, in the range of the size shown herein and also in the range of the size that can be received at once in the data reception processing apparatus A1.

In such a case, the processing method transfer means 415 accumulates the read processing program in the buffer 416, and notices, when transfer of all processing programs is over, the preparation of processing programs in the buffer 416 to the data processing control means 411. The data processing control means 411, when receiving this notice, reads out the processing program from the buffer 416, and sends out to the data processing means 112. The reading operation of processing program herein is shown in FIG. 7, and its operation is described briefly. In FIG. 7, in the case of transfer request 601 and response 602, the read request 550 and read response 570 explained already in FIG. 5 are used respectively.

Figure 7:
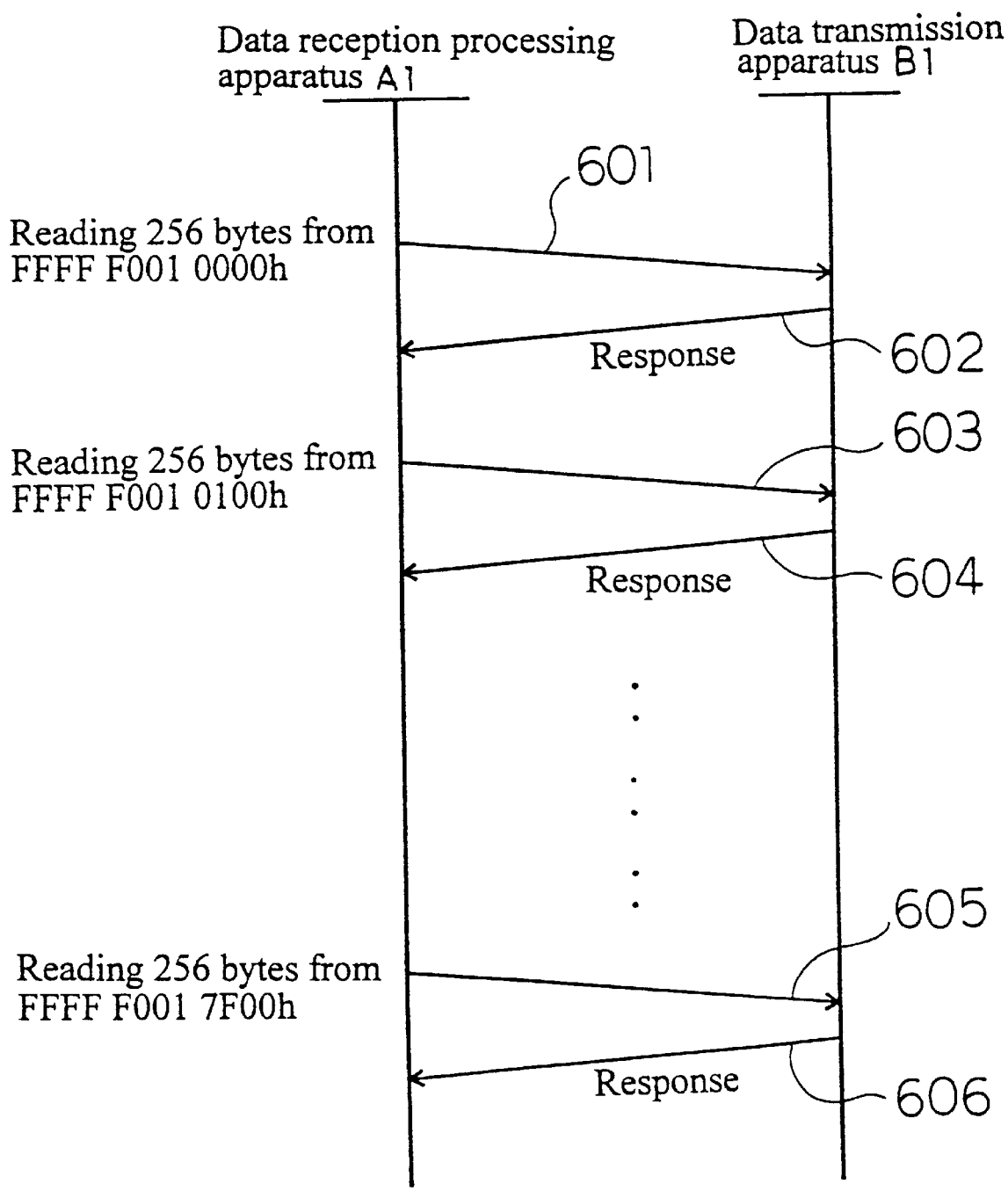
FIG. 7 is an explanatory diagram of reading action of processing program in the same embodiment.

That is, FIG. 7 is a diagram showing transfer in plural times of the processing program 503 in a size of 32K bytes stored in the region 506 of the address space 501, being divided in each size of 256 bytes. Herein, the reason of the dividing size of 256 bytes is the smaller one of the maximum reception size of the data reception processing apparatus A1 and the maximum transmission size of the data transmission apparatus B1 is 256 bytes.

As shown in the diagram, the processing method transfer means 415 of the data reception processing apparatus A1 transmits the transfer request 601 of processing program to the data transmission apparatus B1, by using the address FFFFF0010000 specified from the corresponding system judging means 414. That is, this transfer request 601 is the request for transfer by reading out only the portion of 256 bytes from the beginning address, out of the processing program stored at the beginning address of FFFFF0010000.

The request response means 104 (see FIG. 1) of the data transmission apparatus B1 receiving this transmission request 601 reads out only the portion of 256 bytes from the beginning address, out of the processing program stored at the address of FFFFF0010000 as the beginning address on the address space 501, and sends out to the transmitting means 102, and transfers in the format of packet as the response 602 to the data reception processing apparatus A1 through the transmission medium 101.

Thereafter, similarly, the transfer request 603 is issued from the data reception processing apparatus A1. That is, this transfer request 603 is the request for transfer by reading out the processing program by the portion of 256 bytes from the address FFFFF0010100. The data transmission apparatus B1 receiving this transfer request 603 reads out the processing program from the specified address by the portion of 256 bytes, and transfers as the response 604. In this way, the transfer request 605 and response 606 are repeated, and the processing programs are stored in the buffer 416.

In this embodiment, by using the corresponding system list 502, the data reception processing apparatus specifies the processing method to be transferred, and moreover, in the case of transfer request, the address for reading out each processing program to be transferred from the address space 501 is specified under the control of the data reception processing apparatus, but, alternatively, for example, the address of the writing destination of each processing program to be transferred (corresponding to the address on an address space 951 mentioned later) may be specified under the control of the data transmission apparatus.

That is, the same operation as the processing method transfer means 415 of the data reception processing apparatus A1 is done by the request response means 104 of the data transmission apparatus B1.

Figure 8:
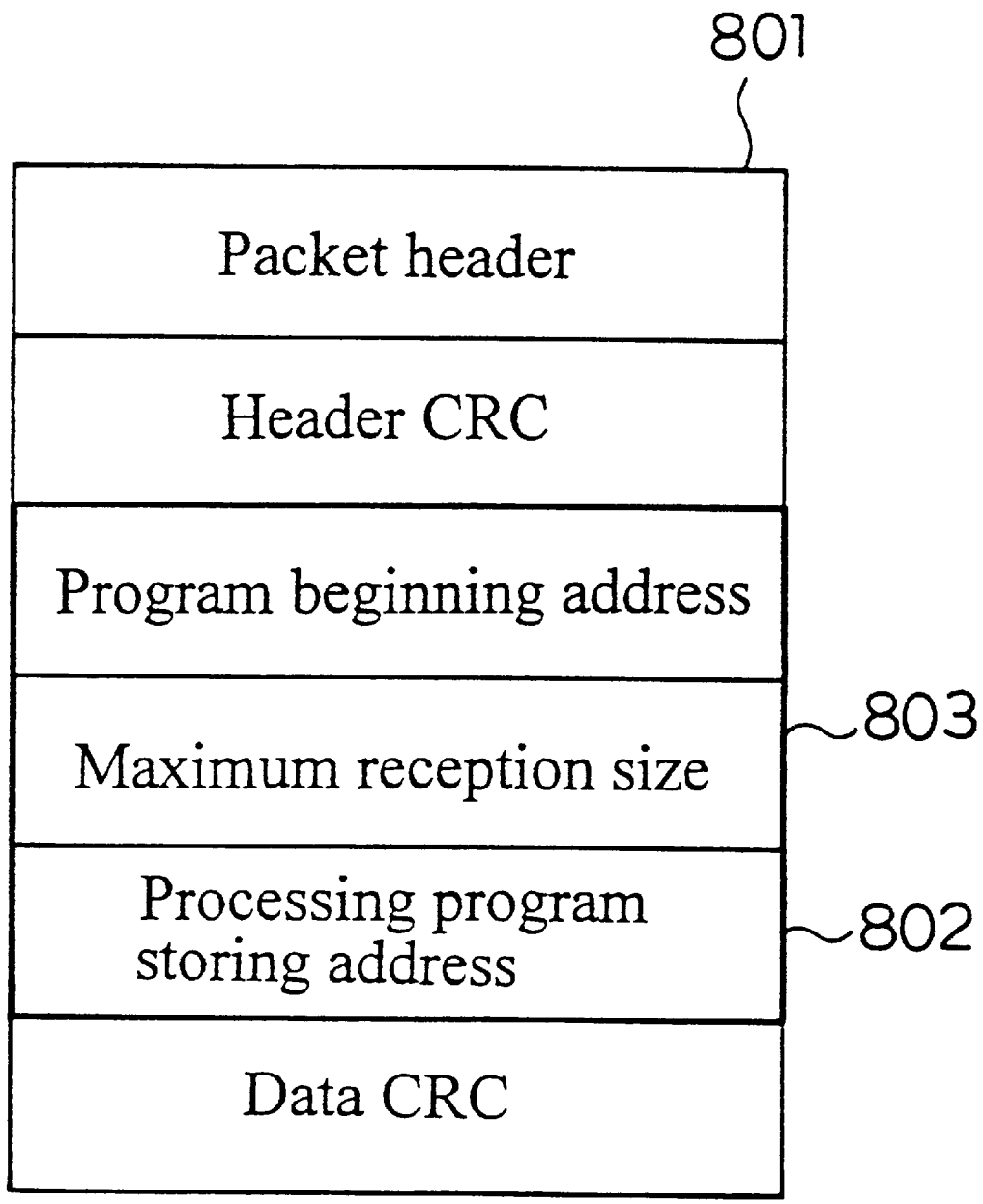
FIG. 8 is a request packet structural diagram in other embodiment of the invention.

In such a case, the processing method request means 415 of the data reception processing apparatus B1 reads out the corresponding system list 502 same as above, and transmits a request 801 as shown in FIG. 8. In FIG. 8, this request 801 includes a program beginning address storing the processing program to be transferred in the data transmission apparatus B1, a processing program storing address 802 storing this processing program in the data reception processing apparatus A1, and a maximum reception size 803.

The request response means 104 of the data transmission apparatus B1 receiving such transfer request 801 of processing method realizes the transfer by writing the processing program 509 placed at the beginning address indicated by the request, in the address space 951 (see FIG. 9) in the data reception processing apparatus A1, in a range of size indicated by the maximum reception size 803 (see FIG. 8).

In this constitution, the operation from transfer request to response is described below while referring to FIG. 10.

Figure 10:
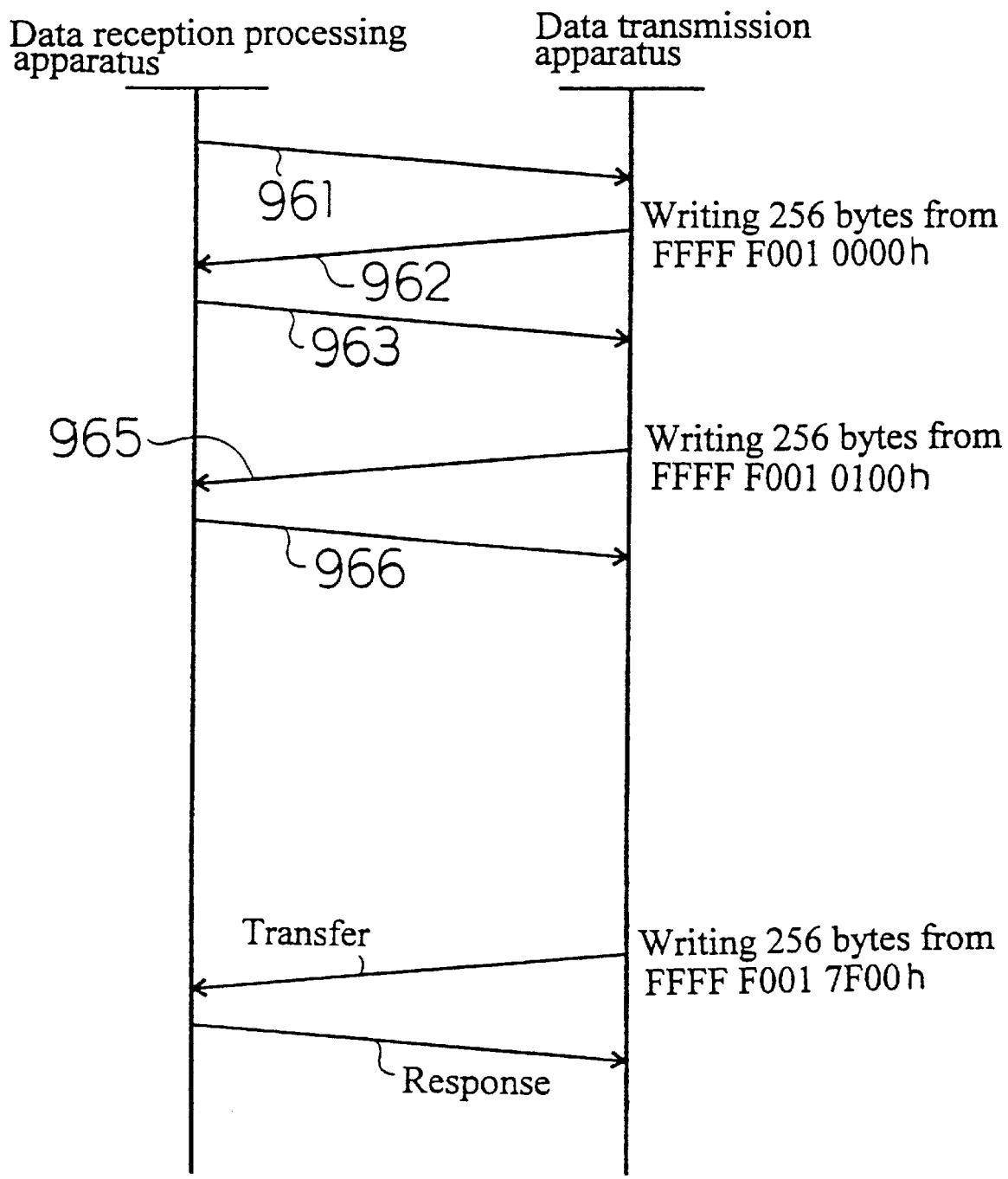
FIG. 10 is an explanatory diagram of write action of processing program in the same embodiment.

As shown in FIG. 10, the data reception processing apparatus A1 specifies the processing program to be transferred, and transmits a transfer request 961 of the processing program, using the packet of the request 801 shown in FIG. 8, to the data transmission apparatus B1. That is, this transfer request 961 also includes an instruction that the beginning address of the storage destination of this processing program is the address FFFFF0010000 of the address space 951 of the data reception processing apparatus A1.

Figure 11A:
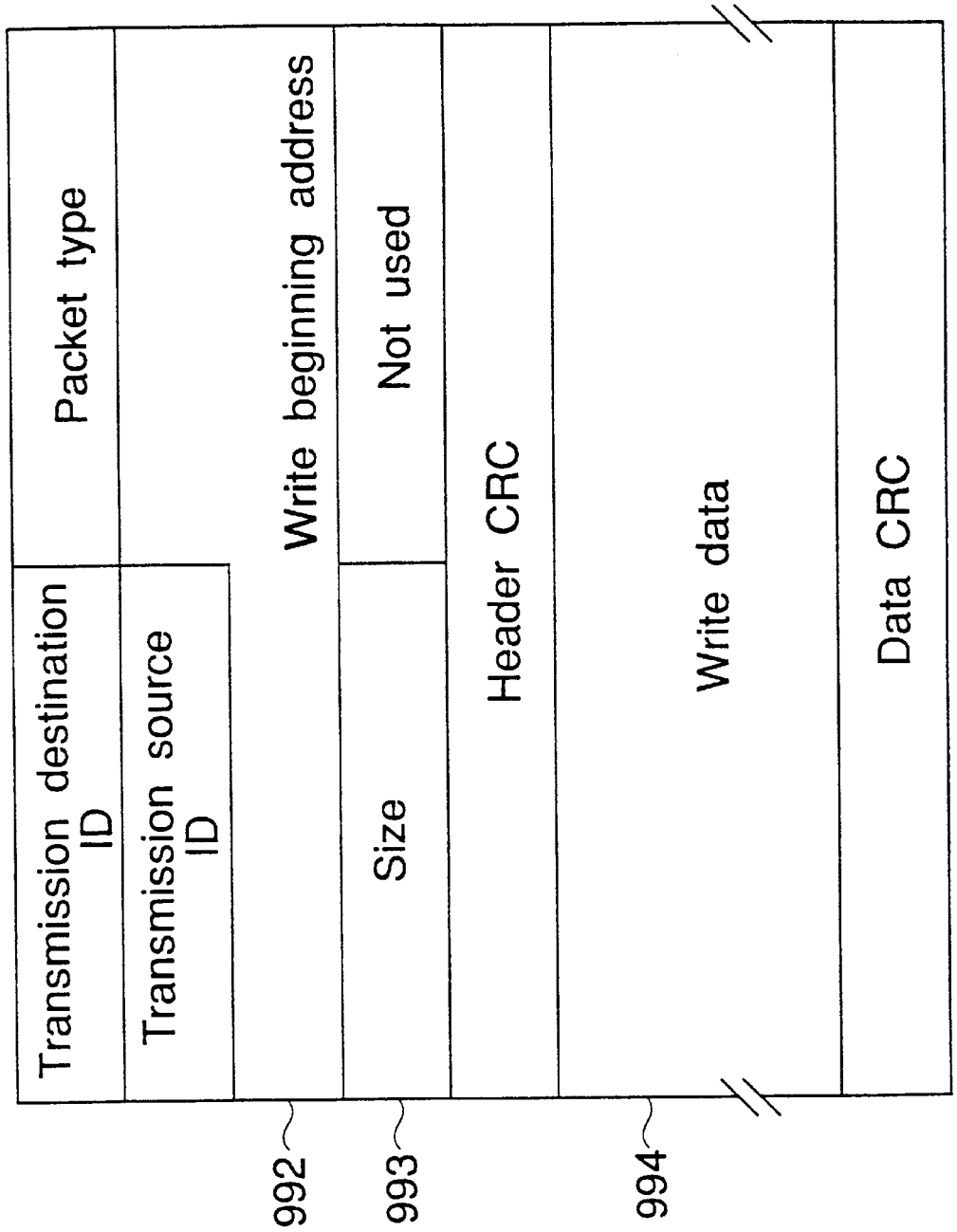
FIG. 11(a) is a packet structural diagram of write request in the same embodiment.

Consequently, the request response means 104 (see FIG. 1) of the data transmission apparatus B1 receiving this transmission request 961 reads out the requested processing program only for the portion of 256 bytes from the specified address on the own address space 501, and issues to the transmitting means 102, together with the data instructing writing from the address FFFFF0010000, and transfers in the format of the packet described below, as a transfer 962 to the data reception processing apparatus A1 through the transmission medium 101 (see FIG. 11(a)). Receiving it, the data reception processing apparatus A1 transmits the completion of writing from the address FFFFF0010000 of the own address space 951 to the data transmission apparatus Bs as the response 963.

Thereafter, same transfer request, transfer and response are repeated until transfer of all processing programs is over. In this case, as a matter of course, the second transfer is the transfer 962 containing the data for instructing writing from address FFFFF0010100.

In this constitution, therefore, the transfer destination, that is, the writing destination address is controlled by the data transmission apparatus B1.

Herein, the composition of the packet used in a series of operation above is described. FIGS. 11(a) and 11(b) are diagrams showing the constitution of write request packet 991, and constitution of write response packet 995. The write request packet 991 includes write beginning address 992, size 993, write data 994, and other information. In the transfer 962 shown in FIG. 10, the write request packet 991 shown in FIG. 11(a) is used, while in the response 963 shown in FIG. 10, the write response packet 995 is used.

In this embodiment, utilizing the corresponding system list 502, the processing method to be transferred is designated by the data reception processing apparatus, but alternatively, as shown in the first embodiment, the processing method to be transferred may be also designated by the data transmission apparatus.

In this case, too, as mentioned already, the transfer of processing program and its control may be realized in two methods, that is, by the data reception processing apparatus A1 and by the data transmission apparatus B1.

First, when the data reception processing apparatus is responsible for transfer and control of processing program, the data reception processing apparatus transmits two of the requests of the processing program shown in FIG. 3 explained in the first embodiment, that is, the request including the channel number 302 and OS/system 303 of the data reception processing apparatus, to the data transmission apparatus. Receiving it, on the other hand, the data transmission apparatus replies the address in which the corresponding program is written, and the maximum transmission size of the data transmission apparatus. Receiving this response, the data reception processing apparatus transfers the processing program in the same procedure as shown in FIG. 7.

On the other hand, when the data transmission apparatus is responsible for transfer of processing program, the data reception processing apparatus adds the storing address of the processing program in the data reception processing apparatus, to the request of processing program shown in FIG. 3 explained in the first embodiment, and transmits to the data transmission apparatus. Receiving this request, the data transmission apparatus specifies the processing program, and writes the processing program into the storing address of the data reception processing apparatus contained in this request, in the same procedure as in FIG. 10.

Incidentally, as the medium recording a program for executing the functions of all or part of such means by a computer, for example, a magnetic disk or optical disk may be prepared, and the same operation can be executed by using such medium.

As clear from the above description, according to the embodiments, by using the identifier 202, it is possible to judge whether transfer of processing program is possible or not, at the moment of receiving the data, at the data reception processing apparatus side.

By placing this identifier 202 in other position than the data type, moreover, transfer of processing program is enabled only when the transmission data is a new type for the data reception processing apparatus.

While the data transmission apparatus is transmitting plural video data or audio data, it can be judged the processing program of which data is being requested, so that the corresponding processing program can be identified.

In the ordinary data transmission and reception apparatus, the data size that can be transferred at once is limited by the capacity of the prepared buffer. Accordingly, it was necessary to divide into small units preliminarily, but the transfer efficiency was lowered. In the embodiments, by using the maximum size that can be transferred, an efficient transfer is realized.

By specifying the address directly on the address space, control of transmission is easier when transferring the processing program by dividing in plural times. Therefore, it is flexible in transfer by dividing in plural times, and there is no effect of transfer sequence in each division.

When transferring data such as processing program, in the case of the constitution in which the writing destination address of the data is controlled by the data transmission apparatus itself, the data transmission apparatus can judge whether or not to transmit the processing program. That is, since it is also taken into consideration whether the data reception processing apparatus requesting the transfer may be permitted as the transfer destination of the processing program or not, it is possible to control charging of a price or judge to allow reception only in the limited data reception processing apparatus.

When the OS used in the data reception processing apparatus or the like is sent as the parameter for transfer request, if the data transmission apparatus side is required judge the host computer compatibility of the OS, it may be difficult in the case of new OS. Such decision may be required in plural OSs. By contrast, when the data reception processing apparatus is designed to specify the corresponding processing program, the relation of the host computer compatibility of the OS can be judged at the data reception processing apparatus side, so that it is flexible to cope with the system extension and version upgrading. Further, in the data reception processing apparatus, if there is no program for the specified OS, as far as the program conversion and software emulation can be effected, a program for other OS can be used. These judgements can be decided at the program reading side.

As clear from the description herein, according to the invention, the reception data processing range in the data reception processing apparatus is much wider than in the prior art.

What is claimed is:

1. A data transmission apparatus comprising:
   data transmitting means for transmitting data processed by a specified processing method to a data reception apparatus,
   storing means for storing a processing method for the data reception apparatus for processing said processed data in the data reception apparatus,
   identification information adding means for adding identification information showing whether transfer of processing method for said data reception apparatus is possible or not, to said transmission data, and
   request response means for issuing the processing method for said data reception apparatus, on the basis of the request relating to the processing method for said data reception apparatus which being transmitted from said data reception apparatus receiving said transmission data.

2. A data transmission apparatus of claim 1, wherein the processing method for said data reception apparatus for processing in said data reception apparatus about the data processed by said specified processing method is available in plural types, and control information holding means is provided for holding the control information of the processing method for said data reception apparatus in said storing means, and
   when said identification information indicates that said transfer is possible, and when receiving said request from said data reception apparatus, all or part of said control information is sent to said data reception apparatus according to the request, and a transfer request of processing method for said data reception apparatus specified by using all or part of the transmitted control information by said data reception apparatus is obtained, and said request response means issues the specified processing method from said storing means.

3. A data transmission apparatus of claim 2, wherein if the processing method for said data reception apparatus specified by said data reception apparatus is transferred in plural divided portions, the control of each transfer is effected by said data reception apparatus.

4. A data transmission apparatus of claim 2, wherein if the processing method for said data reception apparatus specified by said data reception apparatus is transferred in plural divided portions, the control of each transfer is effected by said request response means.

5. A data transmission apparatus of claim 1, wherein the processing method for said data reception apparatus for processing in said data reception apparatus about the data processed by said specified processing method is available in plural types, and when said identification information indicates that said transfer is possible and when receiving said request from said data reception apparatus, the processing method for the data reception apparatus corresponding to the system situation of said data reception apparatus transmitted from said data reception apparatus is specified out of those stored in said storing means, and said request response means issues this specified processing method from said storing means.

6. A data transmission apparatus of claim 5, wherein if said specified processing method for said data reception apparatus is transferred in plural divided portions, the control of each transfer is effected by said data reception apparatus.

7. A data transmission apparatus of claim 5, wherein if said specified processing method for said data reception apparatus is transferred in plural divided portions, the control of each transfer is effected by said request response means.

8. A data transmission apparatus of claim 4, wherein said request response means, when issuing said instruction, also checks if said requesting data reception apparatus may be permitted as the output object of said processing method or not.

9. A data transmission apparatus of claim 7, wherein said request response means, when issuing said instruction, also checks if said requesting data reception apparatus may be permitted as the output object of said processing method or not.

10. A data reception apparatus comprising:
    data receiving means for receiving data processed by a specified processing method, and identification information showing whether transfer of processing method for processing said data at reception side is possible or not from a data transmission apparatus, said identification information being added to said data processed by the specified processing method,
    identifier separating means for separating said added identification information from said reception data,
    data processing means for processing said reception data,
    judging means for judging whether said processing by said data processing means is possible or not, and
    processing method request means for requesting transfer of processing method used in said data processing means about said receiving data to said data transmission apparatus, when said processing is judged impossible by said judging means, and when said separated identifier shows said transfer is possible.

11. A data reception apparatus of claim 10, wherein said data transmission comprises:

data transmitting means for transmitting data processed by a specified processing method to a data reception apparatus, storing means for storing a processing method for the data reception apparatus for processing said processed data in the data reception apparatus, identification information adding means for adding identification information showing whether transfer of processing method for said data reception apparatus is possible or not, to said transmission data, and request response means for issuing the processing method for said data reception apparatus, on the basis of the request relating to the processing method for said data reception apparatus which being transmitted from said data reception apparatus receiving said transmission data.

12. A data reception apparatus of claim 10, wherein said transmission apparatus comprises:

data transmitting means for transmitting data processed by a specified processing method to a data reception apparatus, storing means for storing a processing method for the data reception apparatus for processing said processed data in the data reception apparatus, identification information adding means for adding identification information showing whether transfer of processing method for said data reception apparatus is possible or not, to said transmission data, and request response means for issuing the processing method for said data reception apparatus, on the basis of the request relating to the processing method for said data reception apparatus which being transmitted from said data reception apparatus receiving said transmission data, wherein the processing method for said data reception apparatus for processing in said data reception apparatus about the data processed by said specified processing method is available in plural types, and control information holding means is provided for holding the control information of the processing method for said data reception apparatus in said storing means, and when said identification information indicates that said transfer is possible, and when receiving said request from said data reception apparatus, all or part of said control information is sent to said data reception apparatus according to the request, and a transfer request of processing method for said data reception apparatus specified by using all or part of the transmitted control information by said data reception apparatus is obtained, and said request response means issues the specified processing method from said storing means.

13. A data reception apparatus of claim 10, wherein said data transmission apparatus comprises:

data transmitting means for transmitting data processed by a specified processing method to a data reception apparatus, storing means for storing a processing method for the data reception apparatus for processing said processed data in the data reception apparatus, identification information adding means for adding identification information showing whether transfer of processing method for said data reception apparatus is possible or not, to said transmission data, and request response means for issuing the processing method for said data reception apparatus, on the basis of the request relating to the processing method for said data reception apparatus which being transmitted from said data reception apparatus receiving said transmission data, wherein the processing method for said data reception apparatus for processing in said data reception apparatus about the data processed by said specified processing method is available in plural types, and when said identification information indicates that said transfer is possible and when receiving said request from said data reception apparatus, the processing method for the data reception apparatus corresponding to the system situation of said data reception apparatus transmitted from said data reception apparatus is specified out of those stored in said storing means, and said request response means issues this specified processing method from said storing means.

14. A computer program product configured to store program instructions for executing on a computer system enabling the computer system to perform the steps of:

receiving data processed by a specified processing method and identification information showing whether transfer of processing method for processing said data at reception side is possible or not from a data transmission apparatus, said identification information being added to said data processed by the specified processing method:

separating said added identification information from said reception data;

processing said reception data;

judging whether said processing is possible or not; and requesting transfer of processing method used in said reception data processing step about said receiving data to said data transmission apparatus, when said processing is judged impossible by said judging step and when said separating step shows that transfer is possible.

15. A computer program product configured to store program instructions for executing on a computer system, enabling the computer system to perform the steps of:

transmitting data processed by a specified processing method to a data reception apparatus;

storing a processing method for the data reception apparatus for processing said processed data in the data reception apparatus;

adding identification information showing whether transfer of processing method for said data reception apparatus is possible or not, to said transmission data; and issuing the processing method for said data reception apparatus, on the basis of the request relating to the processing method for said data reception apparatus which is being transmitted from said data reception apparatus receiving said transmission data.

* * * * *